(12) United States Patent
Tang et al.

(10) Patent No.: US 9,742,974 B2
(45) Date of Patent: Aug. 22, 2017

(54) LOCAL POSITIONING AND MOTION ESTIMATION BASED CAMERA VIEWING SYSTEM AND METHODS

(71) Applicants: Xueming Tang, Canton, MI (US); Hai Yu, Canton, MI (US)

(72) Inventors: Xueming Tang, Canton, MI (US); Hai Yu, Canton, MI (US)

(73) Assignee: Hai Yu, Woodbury, MN (US)

( * ) Notice: Subject to any disclaimer, the term of this patent is extended or adjusted under 35 U.S.C. 154(b) by 391 days.

(21) Appl. No.: 14/177,772

(22) Filed: Feb. 11, 2014

(65) Prior Publication Data

US 2015/0042812 A1    Feb. 12, 2015

Related U.S. Application Data

(60) Provisional application No. 61/864,533, filed on Aug. 10, 2013.

(51) Int. Cl.
| | | |
|---|---|---|
| *H04N 5/232* | (2006.01) | |
| *H04N 5/247* | (2006.01) | |
| *A63B 24/00* | (2006.01) | |
| *G06K 9/00* | (2006.01) | |
| *G06K 9/32* | (2006.01) | |
| *G06K 9/62* | (2006.01) | |
| *G06T 7/73* | (2017.01) | |

(52) U.S. Cl.
CPC ..... *H04N 5/23206* (2013.01); *G06K 9/00208* (2013.01); *G06K 9/00342* (2013.01); *G06K 9/32* (2013.01); *G06K 9/6278* (2013.01); *G06T 7/73* (2017.01); *H04N 5/23203* (2013.01); *H04N 5/23296* (2013.01); *H04N 5/247* (2013.01); *G06T 2207/10016* (2013.01); *G06T 2207/30244* (2013.01)

(58) Field of Classification Search
CPC .. G06K 9/00208; G06K 9/00342; G06K 9/32; G06K 9/6278; G06T 2207/10016; G06T 2207/30244; G06T 7/0042; H04N 5/23203; H04N 5/23206; H04N 5/23296; H04N 5/247; A63B 24/00
USPC ........................................................ 348/157
See application file for complete search history.

(56) References Cited

U.S. PATENT DOCUMENTS

| | | | | |
|---|---|---|---|---|
| 6,707,487 B1* | 3/2004 | Aman | ................ | A63B 24/0003 348/169 |
| 6,710,713 B1* | 3/2004 | Russo | ................ | A63B 24/0021 340/573.1 |
| 7,327,383 B2* | 2/2008 | Valleriano | .......... | H04N 1/32101 348/143 |
| 8,508,595 B2* | 8/2013 | An | ....................... | H04N 5/2628 348/143 |

(Continued)

*Primary Examiner* — Francis G Geroleo
(74) *Attorney, Agent, or Firm* — Hai Yu

(57) ABSTRACT

A method and a system for controlling camera orientation in training and exhibition systems. The method and system use a control algorithm to drive the orientation of a camera system at a determined reference velocity in order to place the aim-point of the camera system following a target aim-point in a local coordinate system. In some embodiments, the position and velocity of the target aim-point in the local coordinate system are determined based on dynamically filtered position and motion of a target object, where the position and motion of the target object are measured from a local positioning system.

19 Claims, 16 Drawing Sheets

(56) References Cited

U.S. PATENT DOCUMENTS

| | | | | |
|---|---|---|---|---|
| 9,350,923 | B2* | 5/2016 | Densham | H04N 5/247 |
| 2007/0146484 | A1* | 6/2007 | Horton | A63B 24/0003 |
| | | | | 348/159 |
| 2007/0279494 | A1* | 12/2007 | Aman | G01S 3/7864 |
| | | | | 348/169 |
| 2008/0192116 | A1* | 8/2008 | Tamir | G06T 7/2093 |
| | | | | 348/157 |
| 2009/0040301 | A1* | 2/2009 | Sandler | H04N 7/181 |
| | | | | 348/143 |
| 2009/0213219 | A1* | 8/2009 | Eggert | G06T 7/208 |
| | | | | 348/148 |
| 2010/0321473 | A1* | 12/2010 | An | H04N 5/2628 |
| | | | | 348/47 |
| 2012/0050535 | A1* | 3/2012 | Densham | H04N 5/2224 |
| | | | | 348/159 |
| 2012/0081531 | A1* | 4/2012 | DeAngelis | A63B 24/0021 |
| | | | | 348/77 |
| 2014/0015964 | A1* | 1/2014 | Chew | H04N 5/232 |
| | | | | 348/143 |
| 2014/0320667 | A1* | 10/2014 | Densham | H04N 5/247 |
| | | | | 348/169 |
| 2015/0297949 | A1* | 10/2015 | Aman | G06T 7/2033 |
| | | | | 348/157 |

* cited by examiner

LOCAL POSITIONING AND MOTION ESTIMATION BASED CAMERA VIEWING SYSTEM AND METHODS

CROSS-REFERENCE TO RELATED APPLICATIONS

This application is a continuation of U.S. Provisional Patent Application Ser. No. 61/864,533

TECHNICAL FIELD

The present invention is in the field of camera system and camera view controls, pertains more particularly to apparatus and methods for controlling camera orientation and camera field of view in sport training and exhibition systems. The invented camera viewing system aims at supporting performance recording and assessment for professional and high quality self-training, remote-training, and entertainment purposes.

BACKGROUND

In sport and stage-performance, it is highly desirable to have a way to help people reviewing their performance with sufficient details and focuses in order to improve their skills during training exercises and exhibitions. Camera systems are more and more intensively involved in such training and exhibition systems. The cameras produce video records that can be displayed to users. Both trainees and their instructors can review the recorded performance and exhibition in real time or afterwards to find the insufficiency in the trainee's skill and performance. However, traditional camera recording processes usually need the assistance of a professional person to control the orientation of the camera lens in order to have a performance or exhibition best presented in the camera frames with sufficient focuses on the details. Such assistant services are hardly available or affordable for common exerciser and nonprofessional players.

Professional coaches can only provide training in a limited region and time schedule. People live in a farther region are expecting to have a way to get their specialized coaching remotely. The availability of a public accessible camera viewing and reviewing service will be able to help them realize their dream of self-training and remote-training goals in a most effective and cost-efficient way. Their performance can be recorded and review by professional coaches remotely or in a flexible time schedule. Different from common camera based surveillance systems, the proposed camera viewing service system requires high accurate and agile camera view tracking and focusing control technologies. Such a service system has not been available in common public sport or activity places. Existing auto-recording methods for camera system are either insufficient to follow the dynamic motion of a performer or unable to expose quality details of a performance.

In order to provide the desired services, this invention discloses camera system control methods and apparatus that solve the challenging technical problems of high accurate and agile camera view tracking and focusing controls automatically.

High precision and automatic view control is the critical technology to provide high definition video and smooth target object following in camera view. The core view control technology in this invention applies a unique positioning technology based camera orientation control system to guarantee target following smoothness and centering accuracy as well as best target object exhibition in camera view presentation. Through a locally defined coordinate system over the activity field, positioning techniques from vision based and/or WiFi based systems are innovatively integrated to provide accurate positioning and motion estimation of the target object as well as to support precise camera orientation adjustments. Other supportive technologies are also designed to manage public access to the camera channels and camera records.

The invented camera system and its associated communication and control systems are installed at a public activity place. The service system is public accessible, which means that any user can gain control and operation access to the service system. The service system is automatic, which means that the service system can automatically control its camera to capture the best view of a performer or other target objects with satisfactory quality. The service system is connected and convenient, which means that the service user can view and review his/her performance from any network computer devices like PC, tablet computer, smartphone, etc.

The invented camera viewing system aims at supporting performance recording and assessment in sports, activities and exhibitions to provide professional and high quality self-training, remote-training and entertainment services.

SUMMARY OF THE INVENTION

The following summary provides an overview of various aspects of exemplary implementations of the invention. This summary is not intended to provide an exhaustive description of all of the important aspects of the invention, or to define the scope of the inventions. Rather, this summary is intended to serve as an introduction to the following description of illustrative embodiments.

Illustrative embodiments of the present invention are directed to a method, an apparatus, and a computer readable medium encoded with instructions for controlling camera based training and exhibition video recording systems.

In a preferred embodiment of this invention, video frames are captured from a camera system whose orientation is determined from the camera's position and motion in a camera system coordinate system. Exemplary embodiment of the camera's orientation position and motion include the camera system's pan and tile angles as well as their angular speeds and angular accelerations. Alternative embodiment of the camera's orientation position and motion are realized by a software feature that allows the camera view delivered to the user by panning and tilting digitally within the full view of the camera without physically moving the camera. Exemplary embodiment of the camera's orientation position and motion further include the camera system's position, moving speeds and accelerations on a camera track platform.

The invention disclosed and claimed herein comprises controlling the camera's orientation motion at a desired camera orientation motion in the camera system coordinate. Such a desired camera orientation motion comprises a desired motion transformed from a reference aim-point motion in a locally defined coordinate system. The reference aim-point motion is determined using a control algorithm based on the position error and motion error between the present camera aim-point and a target aim-point, where the present camera aim-point position and motion in a local coordinate system are derived from the measurements of the present camera orientation position and motion in a camera system coordinate system. Alternatively, the present camera aim-point position and motion in the local coordinate system can be determined by processing the image centering information from the camera video frames.

In primary embodiments of the present invention, the term motion indicates velocity. In some embodiments of the present invention, the term motion indicates acceleration. In some other embodiments of the presentation invention, the term motion indicates both velocity and acceleration. For conventions of expression, velocity is used as the exemplary embodiment for the term motion in the following specifications of the present invention.

One novel feature of the camera based training system is to define a local coordinate system over the training or exhibition place. Such a local coordinate system enables seamlessly integration of the local positioning systems, the location and motion estimation for target objects, and the camera orientation controls to achieve high accurate and agile camera orientation controls. Such an innovative local positioning based camera orientation and focusing technology enables high quality camera viewing and recording services. Exemplary embodiment of the local coordinate system is a two dimension or three dimension Cartesian coordinate system. In the two dimension case, two perpendicular lines are chosen and the coordinates of a point are taken to be the signed distances to the lines. In the three dimension case, three perpendicular planes are defined for the local activity region and the three coordinates of any location are the signed distances to each of the planes.

Another novel feature of the camera based training system is to control the camera orientation motion to achieve a reference aim-point velocity determined by a control algorithm. Exemplary embodiments of the control algorithm comprises a feedback control algorithm that compensates the position error and the velocity error in order to place the present aim-point of the camera system close to a target aim-point and to following the target aim-point's velocity in the local coordinate system. The control algorithm further comprises a feedforward control algorithm that uses the velocity of the target aim-point to generate the reference aim-point velocity.

In some embodiments of the present invention, the position and velocity of the target aim-point are predetermined. In yet some embodiments of the present invention, a method for dynamically determining the position and velocity of the target aim-point is included. The method first measures a target object's position in the local coordinate system using a local positioning system. It then estimates the motion of the target object in the local positioning system based on the target object's position measurements. And it also estimates a future position of the target object in the local positioning system. The estimations of the target object's motion and future position are achieved using a Bayes filter algorithm. The method finally determines a target aim-point's position and velocity based on the estimated target object's position and motion.

In some embodiments of the present invention, the measurement of target object's position and motion is obtained from a vision based local positioning system or an assisted vision positioning system. In yet some embodiments of the present invention, the measurement of target object's position and motion is obtained from a WiFi based local positioning system or an enhanced WiFi positioning system. In further some embodiments of the present invention, the measurement of target object's position and motion involves both a WiFi based local positioning system and a vision based local positioning system, or alternatively including their enhanced and assisted versions.

Illustrative embodiments of the present invention are directed to a method, a system, and a computer readable medium encoded with instructions for controlling a camera's orientation to follow a target aim-point in a locally defined coordinate system. Exemplary embodiments of the invention comprise at lease a camera system, a service control system, a locally defined coordinate system, a local positioning system and a communications network. The communications network connects both the camera system and the local positioning system to the service control system. It also provide information and control connections between the system components and between the service system to terminal devices of service users. The communications network comprises wired and wireless communication networks including computer networks, radio networks, and local area communication and control networks.

Additional features and advantages of the invention will be made apparent from the following detailed description of illustrative embodiments.

DETAILED DESCRIPTION OF THE INVENTION

Figure 1:
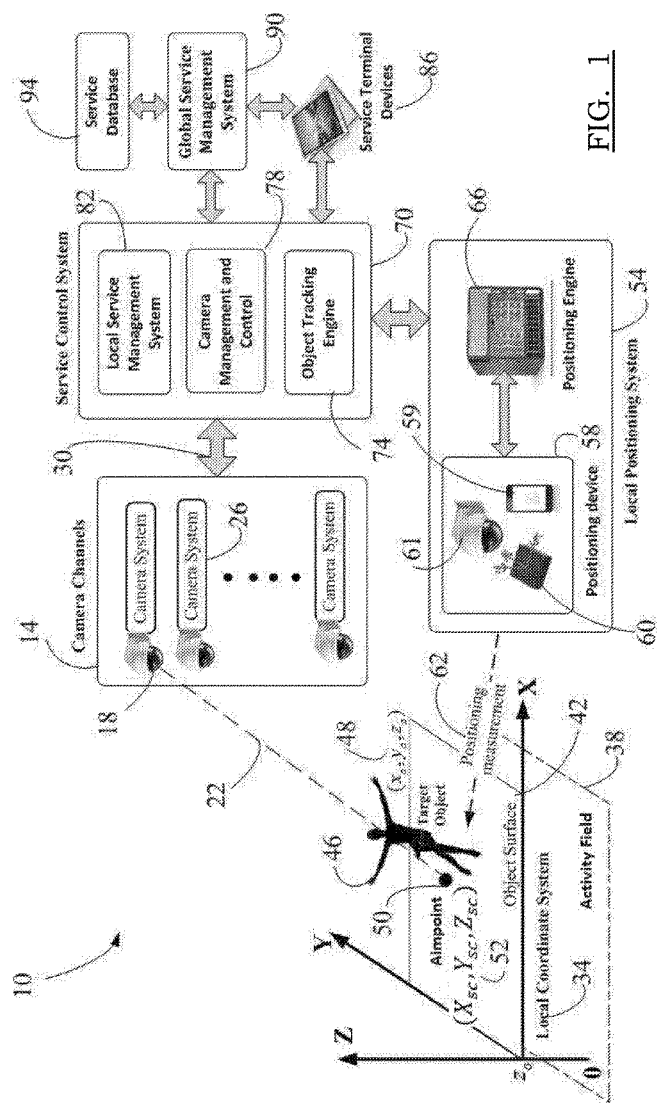
FIG. 1 is a schematic diagram of a local positioning and motion estimation based camera viewing service system that controls camera view to automatically follow a target object according to one or more embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present invention discloses methods and apparatus for a new camera viewing and recording system that provides service for training and entertainment functions by automatically placing the aim-point of a camera system to follow the motion of a target object in a locally defined coordinate system.

In this system, video frames are captured from a camera system whose orientation is determined by the camera platform's position and motion in a camera system coordinate system. Exemplary embodiment of the camera's orientation position and motion include the camera system's pan and tile angles as well as their angular speeds and angular accelerations. Alternative embodiment of the camera's orientation position and motion are realized by a software feature that allows the camera view delivered to the user by panning and tilting digitally a sub-frame within the full view of the camera frame without physically moving the camera. The sub-frame of the camera video is then delivered to service customer as the video output. Exemplary embodiment of the camera's orientation position and motion further include the camera system's position, moving speeds and accelerations on a camera track structure.

The camera's orientation motion is controlled at a desired camera orientation motion in the camera system coordinate. Such a desired camera orientation motion is transformed from a reference aim-point motion in a local coordinate system. A control algorithm determines the reference aim-point motion by minimizing the position error and motion error between the present camera aim-point and a target aim-point. The present camera aim-point position and motion in the local coordinate system are determined from the measurements of the present camera orientation position and motion in the camera system coordinate system. Alternatively, the present camera aim-point position and motion in the local coordinate system can be determined from the camera video frames using image processing technology.

The position and motion of the target aim-point can be predetermined. More importantly, the position and motion of the target aim-point are dynamically determined. The dynamic target aim-point determination method first measures a target object's position in the local coordinate system from a local positioning system. It then estimates the motion of the target object in the local positioning system based on the target object's position measurements. And it also estimates a future position of the target object in the local positioning system. The estimations of motion and future position of the target object are achieved using a Bayes filter algorithm. It finally determines a target aim-point's position and motion based on the estimated target object's position and motion.

In some embodiments of the present invention, the measurement of the target object's position further comprises the position measurements of multiple target objects or multiple points on a target object. In different embodiments of the present invention, the term motion indicates moving velocity or acceleration or both of them. It is used both for translational and angular movements. In the presentation of the proposed invention, velocity is primarily used as the exemplary embodiment for the term motion.

With reference to FIG. 1, a camera viewing and recording service system for automatically controlling the orientation of a camera system to follow a target object and for keeping the target object best exposed in the camera view is illustrated in accordance with one or more embodiments and is generally referenced by numeral 10. The service system 10 comprises camera channels 14, a service control system 70, a local positioning system 54, a locally defined coordinate system 34 and communications networks 30 represented by double arrowed connection lines. Extension of the service system also comprises a global service management system 90, a service database 94 and service terminal devices 86. The communications networks 30 provide information and control communication between the camera channels 14 and the service control system 70, between the local positioning system 54 and the service control system 70, and between the service control system 70 and the extended systems 86 and 90. The communications network 30 integrates computer networks, radio networks, telecommunications networks, and local area communication and control networks. Embodiments of such networks comprise wired communication networks (Internet, Intranet, telephone network, controller area network, Local Interconnect Network, etc. and the like) and wireless networks (mobile network, cellular network, WiFi, Bluetooth, etc. and the like).

A first novelty of the present invention is the incorporation of the local coordinate system (LCS) 34 and the local positioning system 54 to the camera view service system 10. The local coordinate system 34 defined over an activity field 38 enables seamlessly integration of the local positioning system 54, the object tracking engine (OTE) 74, and the camera management and control system 78 to achieve high quality camera viewing and recording services. Exemplary embodiment of the local coordinate system is a two dimension or three dimension Cartesian coordinate system. In the two dimension case, two perpendicular lines are chosen and the coordinates of a point are taken to be the signed distances to the lines. In the three dimension (3D) case, three perpendicular planes are defined for the local activity region and the three coordinates of any location are the signed distances to each of the planes. In the present embodiment of the invention, the local coordinate system 34 is a 3D system with three planes, X-Y, X-Z and Y-Z, perpendicular to each other.

In the local coordinate system 34, an object surface 42 at the height of $z_o$ defines the base activity plane for a target object 46. The object surface 42 is can be in any orientation angle with respect to the 3D planes of the local coordinate system. In the present embodiment, it is illustrated as a plane that is parallel to the X-Y plane. The intersection point of the line-of-sight 22 of a camera 18 with the object surface 42 defines the aim-point 50 of a camera system 26. The position of the target object 46 in the local coordinate system is defined by $(x_o, y_o, z_o)$ 48. The coordinates of aim-point 50 is $(x_{sc}, y_{sc}, z_{sc})$ 52.

The location of the target object 46 in the local coordinate system 34 is determined by the local positioning system 54. The positioning measurement 62 determines the position of the target object 46 in the local coordinate system. It may further determine the motion of the target object 46. Typical local positioning systems 54 comprise at least positioning devices 58 and positioning engine 66. Different types of local positioning systems use different measurement devices for positioning measurement 62. Embodiments of local positioning systems are WiFi based positioning system, enhanced WiFi based positioning system, vision based positioning system, assisted vision based positioning system, etc.

In a WiFi based positioning system, WiFi devices 59 can be used to locate the target object while the position of the devices indicates the same positions of the target objects. Typical WiFi devices include WiFi tag device, smartphone and tablet computer, etc. A WiFi tag is usually small and it has control and display capabilities to support some control functions of the camera viewing system 10. It can be used to control the start and stop of camera view recording. It can also show the system statuses and responses to the present camera channel owner. A WiFi tag device is mainly used to attach to a target object while the activity is going on. Smartphones and tablet computers are typical camera viewing service terminal devices that are used to load and run the camera viewing service applications. On these devices, a user can access system configuration and operation status information as well as user account data. Functions like client side camera channel management, target object finding and confirmation, camera view video recording and reviewing can all be achieved on these devices.

WiFi devices frequently have inertial sensors 60 that can measure both translational accelerations and rotating angular rates. When attached to the target object, these measurement data about the motions of the target object will be transferred via the WiFi network to the positioning engine 66 and further to the object tracking engine 74 to estimate the position and motion of the target object. A WiFi positioning system with inertial measurement 60 from the target object 46 is called an enhanced WiFi positioning system.

From the WiFi devices, information data, operation commands and measurements are transmitted to the access points (APs) of the WiFi network. These information and data will then be sent to a WLAN network station. Besides passing the normal network data to the service control system 70, the WiFi network station redirect the received signal strength (RSS) data and device IDs to the positioning engine 66, where the location of the target object is determined based on fingerprinting data over the local coordinate system 34. The positioning result date is then sent from the local positioning system 54 to the service control system 70.

In a vision based and an assisted vision based positioning system, cameras 61 are used as the position measurement device. Technology details on them will be presented in later sections of this specification. The determined target object's position data, as well as its motion data if available, are sent to the service control system 70. The OTE 74 processes the positioning data to generate estimated position and motion for the target object 46 in the local coordinate system 34.

The service control system 70 contains three major service programs: the camera management and control service (CMC) 78; the OTE 74; and the local service management system (LSM) 82. The LSM 82 is in charge of camera channel resource and user access management as well as data exchanging with the global service management (GSM) system 90. The service control system 70 connects to the GSM 90 via the communications network 30 to exchange system administration and user data on a service database 94. It also provides services to users connected from a computerized service terminal device 86 to access the system for remote operations. The OTE 74 contains critical control functionalities for the camera view system control and management. Such functions include: target object identification and confirmation from camera view; target object position determination and movement state estimations; target aim-point position and motion determination, etc.

The CMC 78 is design to provide camera system control, image processing and camera view presentation functions over camera channels. One major camera system control function is the camera orientation control. To this end, the target aim-point's position and motion information from OTE 74 is used by the CMC 78 to generate commands to control the camera orientation. Such function comprises: 1) obtain and determine the present aim-point position 52 and motion of a camera system 26 in a camera channel 14; 2) determine the reference aim-point motion for the camera system 26; 3) transform the reference aim-point motion in the local coordinate system to desired motions in the corresponding camera system coordinate system; and 4) command camera orientation control to realize the desired motion in the camera system coordinate system.

More specifically, the camera channel's pan, tilt, zooming parameters and their speeds will be determined together with its frame rate, resolution and lighting parameter. Advanced camera channels have track system to change the location of the camera system platform. The platform position and moving speeds are also controlled by CMC 78.

The CMC 78 is also responsible for recognizing target objects and their identifying features in captured camera video frames using image processing technologies. Such object recognition functions are critical to support the vision based and assisted vision based positioning system as well as to refine the final camera view presented to service users. Other camera control parameters, like zooming ratio, iris, resolution, etc., are also determined from the extracted features of the target objects to achieve best presentation of them in the camera video frames.

The final camera channel view frames are further processed by CMC 78 to optimize the quality of target object exhibition vs. system constraints. For example, a final camera view may retain high definition image around the target object but reduced image quality on the rest of the image frame region to satisfy video transmission within allowable network bandwidth. The camera channel operation commands will be sent to the camera channels 14 for executions. The camera channels 14 feedbacks their camera system operation states and camera view frames back to the service control system 70.

The camera channels 14 contain one or multiple camera channels. Each camera channel contains at least one camera system 26 for viewing and video recording services provided as a unit to service customers. Each camera system 26 has one camera 18. The camera line-of-sight 22 is the centerline of the camera lens and it determines the center point of the camera view. The line-of-sight is controlled through camera orientation control by adjusting the pan and tile angles of the camera platform as well as the camera platform's position on a camera track. The proposed technology aims to automatically control the camera orientation such that the aim-point 50 is placed at optimally relative position and motion with respect to the target object 46 in the local coordinate system 34 in a continuous, accurate and smooth manner. As a result, this achieves the best exhibition of the target object in the camera view and the recorded video frames can present sufficient focuses and details on the performance and process of the target object.

The LSM 82 provides administration service over camera channels, service terminals, operation requests, data processing and transmission. It checks the status of all camera channels in a system to determine their availability. A camera channel IN-USE or in maintenance is not accessible by users. Unused and ready camera channels will be labeled OPEN and these camera channels can be accessed by public users. For each camera channel, LSM 82 will also provide description information to the service application program at user's terminal device to display camera channel configuration, camera installation topology, platform position and sight of view angle to the activity field, current view, available time duration and schedule, channel and camera parameters, control methods, etc.

Once a user starts the camera viewing application program at a network terminal device (smartphone, service PDA, tablet computer, PC, etc.), the user will be added to the active user list and the LSM 82 will transmit system information data to the service application at user's terminal devices 86. A user can connect to LSM 82 either using a registered user account or using a temporary name and assigned temporary account. Different types of user and account will have different levels of right and authorization to access the camera channel, service function and other system service resources. The LSM 82 will also exchange account information and data with a higher level of regional service management (RSM) system or the global service management (GSM) center 90.

After connected to LSM 82, a user can request to access OPEN camera channels or to add request to waitlist of IN-USE camera channels. Camera channel schedule can be displayed on the user's terminal application such that a user can book camera channel time at available time slots. Alternatively, event based camera channel reservation can be made by registered users. For example, an event can be defined as the appearance of an indicated performer. In this case, the activity schedule and progress will be effectively communicated with the LSM 82. The occurrence of a specified event will trigger the camera channel assignment and connection to the terminal devices of users who have specified this event or registered for this predefined event.

After satisfying access qualification conditions, OPEN camera channel will be assigned to a user. The instantaneous camera channel view will be displayed on the user's terminal device. The user will start owning control authority over the camera channel to use available camera view control functionalities. For example, a user can start control the pan-tilt, zooming angle of a camera channel and its adjustment speed to view different regions and details over an activity area. The user can also control the view quality and recording function to start record camera view in video. Most importantly, a channel user can specify target object from the camera view. After confirmed, the camera channel will start automatically following the target object to keep it in a best exhibition in the camera channel view. It is necessary to point out that multiple users can be added to access a camera channel view when they have a common target object or when no object specified. Service users whose target objects sharing a common activity area can also share a camera channel view by defining the target object as a group of objects. Furthermore, multiple camera channel views can also be shared among multiple channel users even from different type of terminals, wireless or internet, on-site or remotely.

A channel user can control the transmission of camera channel view to his/her terminal device as well as the camera channel view recording function. A channel user can either view the target object from the transmitted camera channel view instantaneously or review the recorded video data after the recording finishes. After finishing, a channel user can release his/her access and return the camera channel to the system. When booked camera channel time expires, the camera channel will be released and returned to the system. A channel may have the ability to extend the usage in certain application situations.

Figure 2:
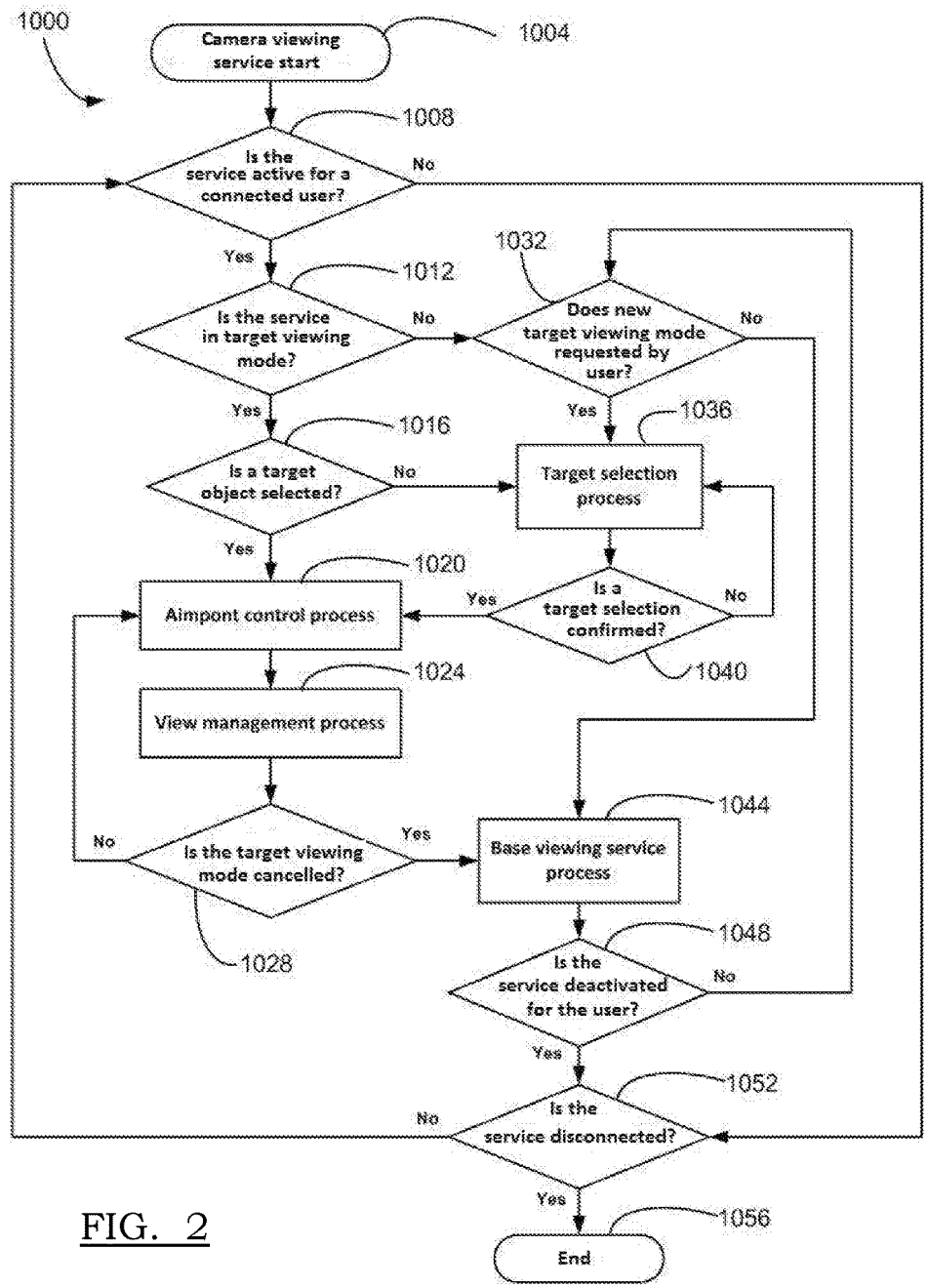
FIG. 2 is a flowchart illustrating an exemplary service process of the camera viewing service system according to one or more embodiments.

With reference to FIG. 2, a method for public accessible camera viewing services for connected users is illustrated according to one or more embodiments and is generally referenced by numeral 1000. After the camera viewing service starts at step 1004, it first checks for any connected user whether the service is activated for the user or not at step 1008. An active service for a user is the usage of a camera channel has been granted to the user. For users without active service, the method next monitors if the users are still connected to the service system at step 1052. When the service connection is still present, the method will next go to the activation status monitoring step at 1008. When the user disconnects from the service system, the method for camera viewing control process will end at step 1056. On the other hand, the service status for a connected user will change to active when LSM 82 grants a camera channel to the user. Camera viewing service applications can then start.

The camera viewing service application has at least two viewing modes: a target viewing mode and a base viewing mode. The base viewing mode enables a base viewing service process where the user navigates the camera view to allowable orientation positions manually while viewing the activity field. This is usually achieved through pan, tilt and zoom control by manually set their corresponding parameter values. The camera system control system will then operate the camera system 26 to realize desired orientation and zooming according to the user's pan, tilt and zooming parameter inputs. Advanced system also allow user to adjust the position of the camera system along the camera track. Additional parameters in the manually operated mode further comprise camera resolution and camera image quality related settings. The target viewing mode enables automatic camera view tracking of target object in the activity field. In this mode, the camera orientation and track positioning are no longer controlled by the user. After a target object has been selected and confirmed by the user, the camera orientation and track position controls are primarily carried out by an automatic aim-point control process.

When a camera channel is assigned for service usage to a connected user, the service becomes active for the user at step 1008. After that, the camera viewing service method for public accessible camera viewing services checks the service mode selected by the user at step 1012. If the present service mode is in target viewing mode, the camera viewing service method next checks if a target object has been selected or not at step 1016. Before a target object is selected and confirmed by the user, the camera viewing service method will go to the target selection process at step 1036. In this process, identified objects in the present camera view are highlighted. Such camera view with highlighted candidate target objects is displayed to the user on his/her service terminal devices (cellphone, tablet computer or other computerized displaying devices). During the target selection process, users can still manually operation the camera system to navigate the camera view to his/her interested region in the activity field. Such operation is the same as that in the base viewing mode except the camera view presented to the user contains highlighted candidate target objects. Once a desired candidate target object is in the camera view displayed on the screen of the user's terminal device. The user can select the object and confirm it as the target object. This process continues at step 1040 until the target object is selected and then the camera viewing service method will go to step 1020. It is important to point out that a target object may be constructed by multiple candidate objects or by a group object.

At step 1020, the aim-point control process is carried out. After that, the view management process is executed at step 1024. The view management process determines control parameters for the camera channel other than the camera orientation and position parameters. It determine the quality and focus of the camera view at the present camera orientation (line-of-sight and aim-point) as well as how the present camera view shall be presented to the user at the user's service terminal devices. After successfully communicating the present camera frame to the user, the camera viewing service method will check on if the target viewing mode is cancelled or not at step 1028. The aim-point control process 1020 and view management process 1024 will continue if the service stays in target viewing mode. Otherwise, the camera viewing service method switches to the base viewing mode, where the base viewing service process is carried out at step 1044.

If the service is not in target viewing mode at step 1012, the camera viewing service method next check if the target viewing mode is selected by the user. When selected, it continues with step 1036. Otherwise, it next goes to the base viewing service process at step 1044. While the service system is manually operated by the user, the camera viewing service method monitors the service activation status at step 1048. The present active service can be terminated either by the user or by the service system. The still active service continues to step 1032 to watch on possible viewing mode switches. When the camera viewing service is deactivated at step 1048, the camera viewing service method next check on the service connection status for the user. The service process ends after disconnection but it will continue at step 1008 if the service is still connected from the user.

Figure 3:
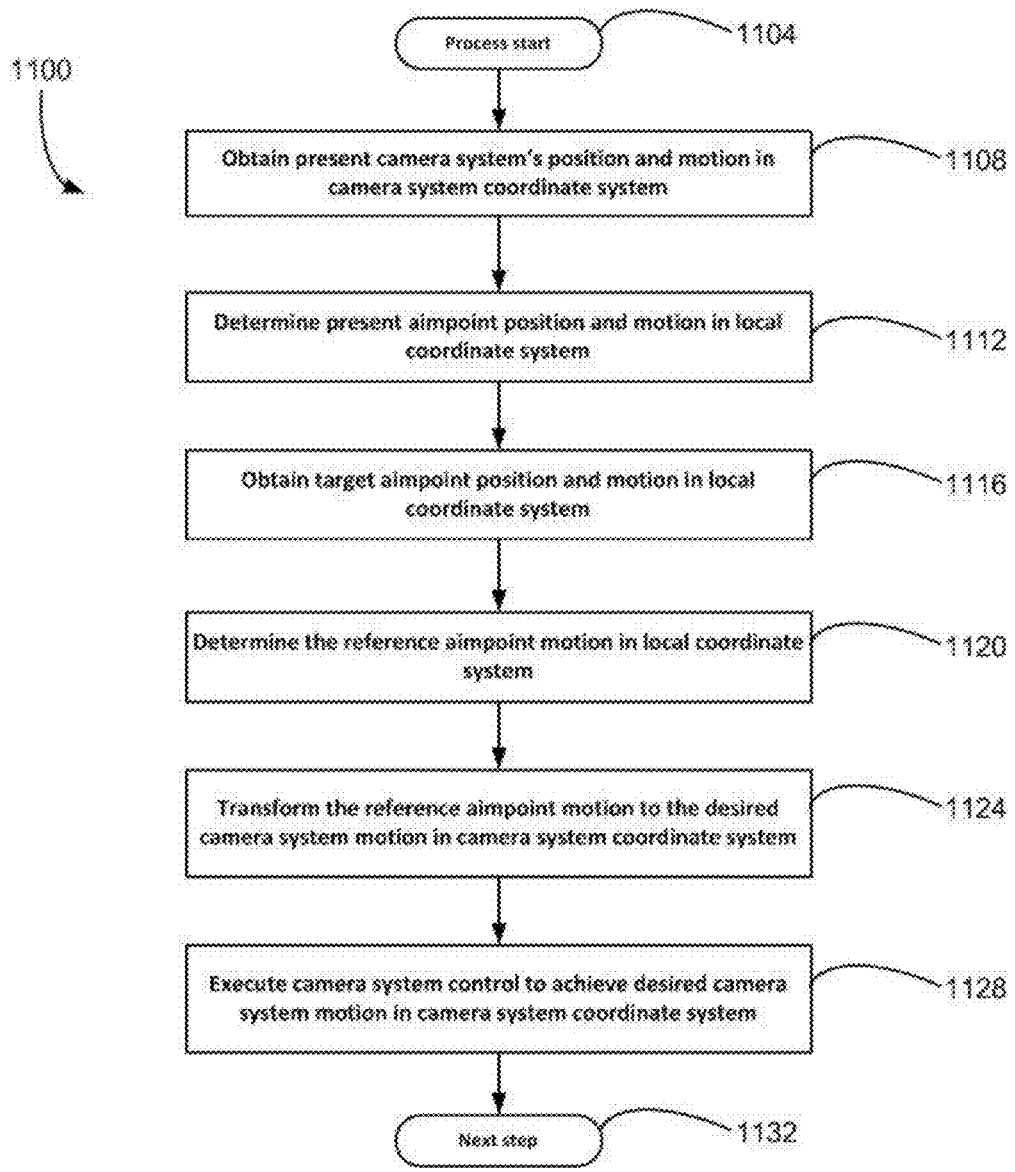
FIG. 3 is a flowchart illustrating a method for camera orientation control of the camera viewing service system according to one or more embodiments.

With reference to FIG. 3, a method for automatic camera system aim-point control process, referred by 1020 in FIG. 2, is illustrated according to one or more embodiments and is generally referenced by numeral 1100. After the process starts at 1104, it obtains the present camera system's position and motion in the camera system coordinate system at step 1108. Then, the present camera aim-point position and motion in the local coordinate system is determined at step 1112 by transform the position and motion from the camera system coordinate system to the corresponding position and motion of the intersecting point of the camera line-of-sight on the object surface plane. Next, the process obtains the target aim-point position and motion in the local coordinate system from OTE 74 at step 1116. The reference aim-point motion in the local coordinate system is then determined by the control algorithm in CMC 78 at step 1120. At step 1124, the determined reference aim-point motion is transform to the desired camera system motion in the camera system coordinate system into pan and tilt angular motions. Such a motion transformation and interpretation method at step 124 may further comprises determining the desired camera system track motion. The final desired camera system motion is realized by the camera system controller at step 1128. The process stops and then it continues with a new iteration of the process 1100 at step 1132. When a camera system's line-of-sight control is involved in the camera orientation control process, especially when the camera system position and motion on a camera track system are to be controlled, the camera line-or-sight control follows similar control process as 1100 for camera system aim-point control. In this case, a target line-of-sight's direction and motion are used to determine a desired ling-of-sight motion in the camera system coordinate system.

Figure 4:
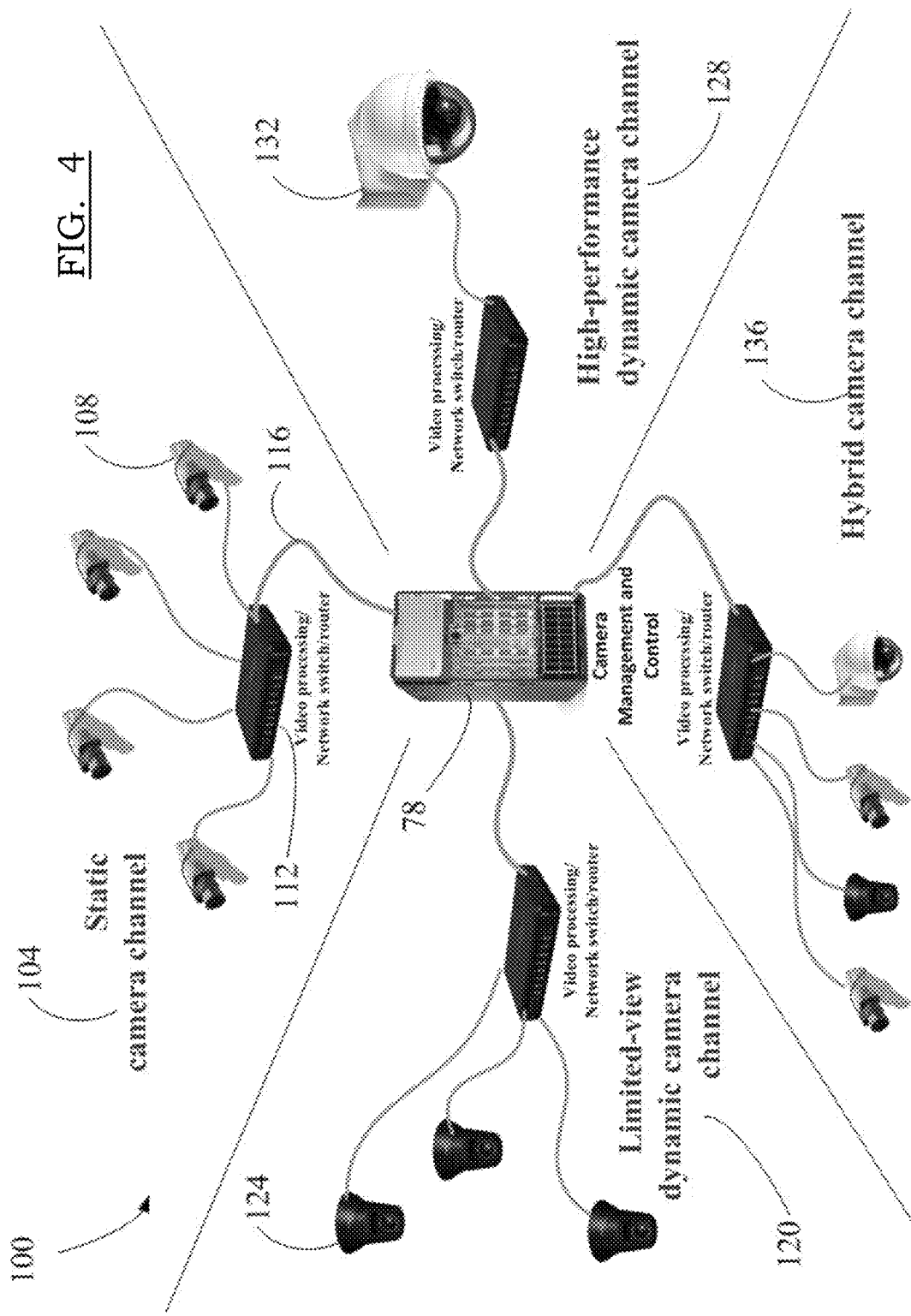
FIG. 4 is a schematic diagram of camera channels used in the camera viewing service system of FIG. 1, illustrating its components and interconnection between the camera management and control system and different camera channels according to one or more embodiments.

Camera channels 14 are the first critical component in the camera viewing service system 10. A camera channel may contain different types of camera systems. Analog cameras and IP cameras are typically used. Depending on the camera system's orientation and zooming capability, the camera systems used are further classified to three categories: static camera system, limited-view pan-tilt-zooming (LV-PTZ) camera system and high-performance PTZ (HP-PTZ) camera system. With reference to FIG. 4, different types of camera channels are illustrated and depicted by 100. Four exemplary embodiments of the camera channels are presented including: static camera channel 104; limited-view dynamic camera channel 120; high-performance dynamic camera channel 128; and hybrid camera channel 136.

The static camera system 108 has fixed orientation after installation. Their zooming and focus may be controlled to achieve different levels of coverage and details over a portion of the activity field. A camera channel solely using static camera are usually constructed with multiple camera systems. A large activity area is partitioned and assigned to each of the camera systems such that the camera view together covers the area of the whole activity field. As a target object moves across regions of the activity field, the final camera channel view output is either obtained by switching to one camera view among all the camera systems or generated by view synthesized from multiple or all of the static camera views. For this type of camera channel 104, a camera view switching and synthesizing strategy is needed to approximate the orientation controls in order to cover an object of interest in the final camera view frames with sufficient exhibition quality.

The LV-PTZ camera system 124 has better area coverage and focusing than the static cameras because they have controllable pan, tilt and zooming capabilities. The orientation and zooming of the camera lens can be adjusted to achieve variable area coverage and detailing. But, such capabilities for LV-PTZ cameras are limited either in their maximal achievable angles of adjustable and zooming ratio, or in their slow orientation and zooming adjustment speed.

As a result, a camera channel 120 using LV-PTZ camera may still consist of multiple LV-PTZ cameras to achieve a sufficient coverage over an activity field. Furthermore, the camera view switching and synthesizing function is still needed. The camera channels with static camera or LV-PTZ camera provides cheaper system solutions.

The HP-PTZ camera system 132 is devices that provide wide range of pan-tilt-zooming capability at sufficiently fast orientation adjustment speed and accuracy. Such pan-tilt-zooming control capabilities can either be realized using motors to physically adjust the zoom and the pan and tilt angle of the camera platform, or alternatively be achieved digitally by navigating the output camera view within a higher resolution and larger view of the camera without physically moving the camera. Unlike traditional PTZs the Digital PTZ cameras allow multiple users to pan, tilt and zoom independently without affecting the recording of the system.

A single HP-PTZ camera is usually sufficient to construct a camera channel as it can provide sufficient coverage and detailing over a whole activity area. The pan-tilt and zooming of the HP-PTZ camera can be controlled according to the motion of a target object. As a result, the camera view can follow the moving target object smoothly. The presence of the target object in the camera view can be positioned relatively with respect to the center of the view with optimized ratio between the size of the target object and the size of the view picture frames. Furthermore, the video frame rate and picture resolution can also be controlled with respect to the translational and rotating speeds of the target object in order to achieve a sufficient detailing of motions. All these technologies and system enable the camera viewing system supports public applications, especially for high performance sports, show and contests. The angle of the sight of view for a single HP-PTZ camera is largely constrained by its platform position. Such a platform may be fixed or movable on a predesigned structure of trials, called camera track. Due to continuous platform motion, the sight of view angle cannot be changed rapidly to support view switching from different view angles towards the target object. For example, a camera viewing the back side of a target object cannot provide the view facing the target object in continuous view frames. In applications where highly dynamic camera viewing over agile motion objects is needed, multiple HP-PTZ cameras are needed to construct a camera channel 128 together with the camera view switching and synthesizing function. Alternatively, given only single HP-PTZ camera channels are available, multiple camera channels can be organized in cooperation to achieve an object following camera viewing task.

The hybrid camera channel 136 is a camera channel that is constructed with multiple camera systems form a mixture types of the afore-mentioned camera systems. In the camera viewing service system, a camera channel is not only used for capture views over objects, but also used for vision positioning based target object location estimation. A camera channel subsystem comprises cameras and their associated supporting video processing, operation control and communication devices 212. Typical supporting devices include, but not limited to, video encoder/decoder, AD/DA converter, network switch/router, wired/wireless network device, signal/data processing device, camera platform and pan-tilt-zooming control devices, etc. A camera channel connects to the CMC 78 on the service control system 70 through a communication connection 216, which a type of the communications network 30. All the aforementioned camera systems may also have digital PTZ functions that enable the delivered camera video output to navigate within a larger and higher resolution full scale camera video frame in order to focus and zoom in on an area of interest in the activity field. No physical orientation motion of the camera system is needed in this case.

A camera channel can be controlled to capture views in its video frames while following target objects. To this end, the primary set of inputs to a camera channel contains the control commands that determine the view out of the camera channel. Such commands contains camera on/off, camera orientation and focus adjustment (pan-tilt-zooming, etc.), view switching among cameras, multiple view synthesis and after-effects, etc. The secondary set of inputs to a camera channel contains system configuration and conditioning parameters and commands like channel and device mode control, diagnostics, audio and lighting controls, etc.

The primary output of a camera channel is the camera channel view picture frames. Such a final channel view can either obtained from the view of one of the cameras or synthesized from the views of multiple cameras. The secondary set of outputs from a camera channel includes the operation states and measurements of all the devices used in this camera channel, the position of the camera channel and its platform, the orientation of its camera lens and focusing parameters (pan-tilt-zooming states and speeds), etc.

Figure 5:
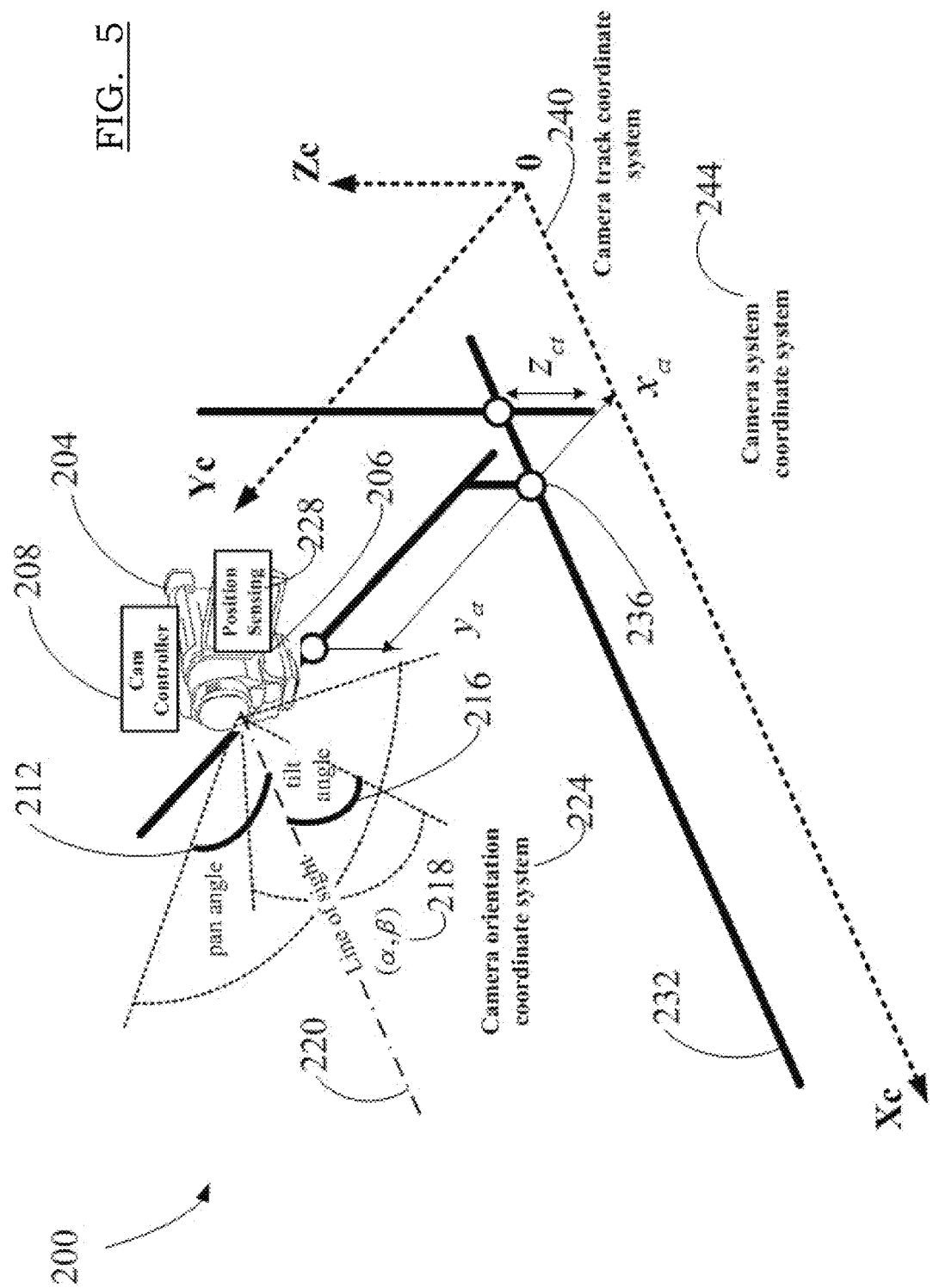
FIG. 5 is an illustration of a camera system with camera platform and track in a defined camera system coordinate system according to one or more embodiments.

With reference to FIG. 5, an embodiment of physical PTZ camera system is illustrated and depicted by 200. A camera system comprises the following basic subsystems: a camera 204, a camera platform 206 with pan and tilt capability and a defined camera system coordinate system 244. Some camera system 200 further comprises a camera track system 232 and a camera track coordinate system 240.

The camera 204 is an optical instrument that records images and videos of camera views. The camera 204 has a line-of-sight 220 that determines the center of its view. The camera 204 has a camera platform 206 that can provide pan and tilt motion to adjust the orientation of the camera line-of-sight 220. The camera controller 208 is not only responsible to control the camera's basic functions and operations, but also in charge of controlling the camera orientation adjustment by operating the pan and tilt functions of the camera platform 206. The camera platform's pan angle 212 and tilt angle 216 determines its coordinates ($\alpha,\beta$) 216 in a camera orientation coordinate system 224. The camera platform 206 also has a position sensing unit 228 to measure and report the present pan and tile angle of the camera platform 206. The position sensing unit 228 may further provide the pan and tilt motion measurements of the camera platform 206.

The camera system 200 optionally comprises a camera track subsystem 232 that supports translational motion of the camera platform on the track through movable connections 236. Multiple movable connections 236 are illustrated in FIG. 3 by joint circles. Such connections provide longitudinal, lateral and vertical motions along the $x_c$, $y_c$ and $z_c$ axis of a camera track coordinate system 240. The coordinates of the camera platform 206 is ($x_{ct}$, $y_{ct}$, $z_{it}$)) in the camera track coordinate system. The camera orientation coordinate system 224 and the camera track coordinate system 240 together construct the camera system coordinate system 244. For camera systems 200 that do not have camera track subsystem 232, the camera system coordinate system 244 is the same as the camera orientation coordinate system 224.

Figure 6:
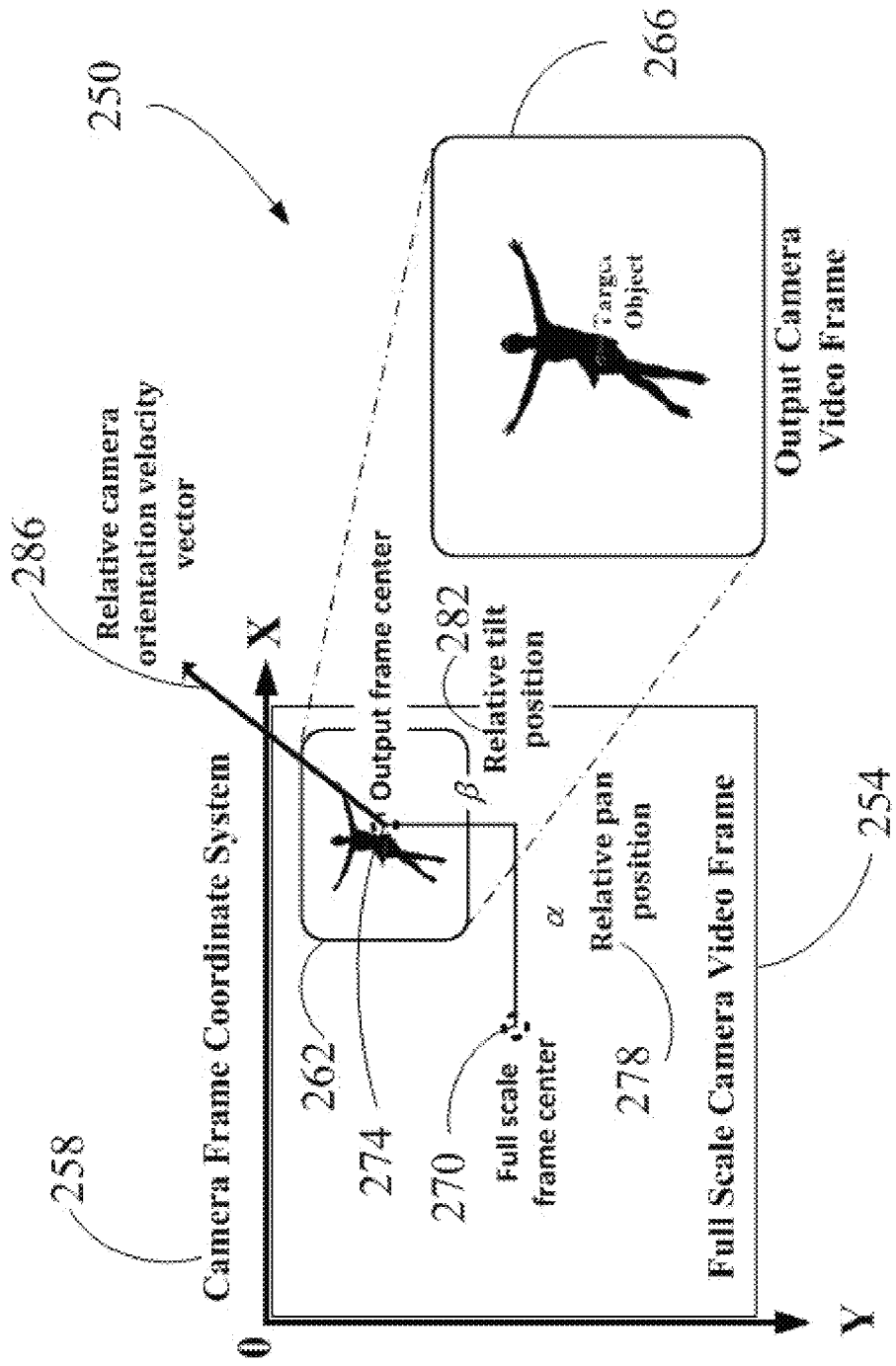
FIG. 6 is an illustration of a camera system with digital pan-tilt-zooming control to determine its orientation in a defined camera system coordinate system according to one or more embodiments.

With reference to FIG. 6, an alternative embodiment of the PTZ camera system is illustrated and depicted by 250. In this embodiment, the pan-tilt-zooming capabilities of the camera system are realized digitally by a software feature in camera controller. First, a high resolution full scale camera view video frame 254 is capture by the camera system. A camera frame coordinate system 258 is defined for the video frame 254 with X axis and Y axis perpendicular to each other. These axes define the horizontal and vertical position of image pixels.

The output camera view frame 266 delivered to service customers is only a subarea 262 of the original full scale camera video frame 254. The area of frame 266 vs. the area of frame 254 is determined by the digital zooming ratio of the digital PTZ function. The relative pixel position difference between the full scale frame center 270 and the output frame center 274 in the camera frame coordinate system determines the relative pan and tilt positions of the output frame 266 with respect to the full scale frame 254. In this case, the pan position 278 is defined by the horizontal distance $\alpha$ between center 270 and center 274. The tilt position 282 is defined by the vertical distance $\beta$ between the centers. The digital pan motion is along the X-axis and the digital tilt motion is along the Y-axis in the camera frame coordinate system. In continuous video frame outputs, the relative motion of the output frame center 274 with respect to the full scale frame center 270 defines the orientation motion of the camera viewing system. Particularly, the relative orientation velocity vector $[u_\alpha, u_\beta]$ of the output frame with respect to the full scale video frame is depicted by the arrow 286. In a digital PTZ embodiment of the camera orientation control system, the camera frame coordinate system is also the camera system coordinate system.

The most pioneering and distinctive technology in this camera viewing service system is the integration of the local positioning system to the camera viewing control system. The objectives of building a local positioning system are to support robust and accurate object location and motion velocity estimations as well as the camera orientation controls such that the camera viewing service can achieve satisfactory and high quality target following performance. To this end, this service system applies three exemplary embodiments of local positioning technologies that include the vision based positioning method, the WLAN positioning method and the dead reckoning based positioning method. In applications, these technologies can either be used independently or in an integrated manner depending on their availability and system configuration. GPS may be used together with the aforementioned positioning systems in certain cases. Sensor fusion techniques are used to synthesize the multi-sensor information together in order to significantly enhance the accuracy and reliability of the location recognition and motion state estimation for the target object.

It is important to point out that the following descriptions of the technologies use target objects on a planar activity ground as an example to demonstrate the invention. This shall not be treated to limit the scale of the invention. The presented technology can be easily modified and extended to support applications in which the activities of the target object involves large vertical motions. The development of the local positioning system starts with the establishment of a local coordinate system over the activity field. The X-Y-Z axis of the coordinate system are defined on the activity field such that each location/point in the field is assigned a unique coordinate tuple (x, y, z). Such a local coordinate system provides a unified reference frame for the positioning systems used in this invention.

Figure 7:
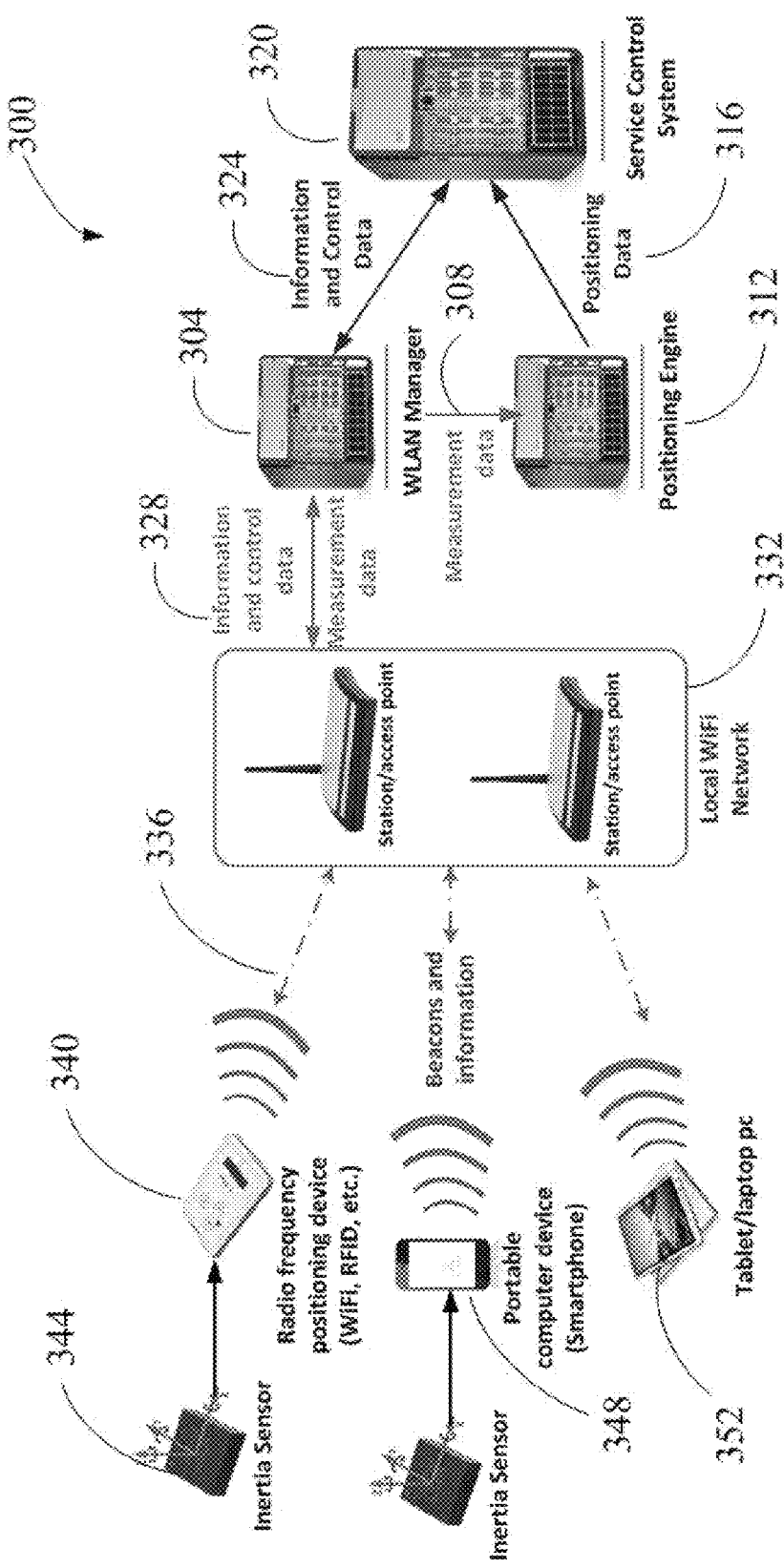
FIG. 7 is a schematic diagram of a WLAN based local positioning system that can determine the position of radio frequency communication or positioning devices in an area covered by WLAN network according to one or more embodiments.

With reference to FIG. 7, a WiFi based local positioning system is illustrated in accordance with one or more embodiments and is generally referenced by numeral 300. Such WiFi based local positioning system is used to determine the location of a target object in the local coordinate system assuming a WiFi device is attached to the target object.

In this camera viewing service system, a wireless local area network (WLAN) is used not only for data communication between the system and service users, but also for local positioning over the activity field. In the presentation of the proposed invention, a WiFi network is used as an exemplary embodiment for WLAN. For applications in an outdoor environment, GPS and similar radio network systems can also be used to support the object location estimation function. WiFi positioning has a distinct advantage of low cost and wireless connectivity. Through the local WiFi network, service users connect to the camera view service system from wireless service terminal devices like smartphone, tablet/laptop computer, desktop computer or WiFi attachment devices. Although WiFi has not been designed for positioning, its radio signal can be used for location estimation by exploiting the Received Signal Strength (RSS) value measured with respect to WiFi access points (APs). Alternatively, Angle of Arrival (AoA) can be used to determine the location based on geometry. In this case, the antennas used must be able to measure the phase-shift of incoming signals.

A typical local WiFi network 332 comprises WLAN stations and multiple access points. The distribution of the access points constructs a network topology that can be used for RSS fingerprinting based positioning service. Beacons and information messages 336 are communicated between the local WiFi network 332 and the wireless service terminal devices. Exemplary wireless service terminal devices are portable computer device like smartphone 348 and table/laptop computer 352. Other exemplary wireless service terminal devices are radio frequency positioning devices 340, like WiFi tag, RFID tag, etc. Certain terminal devices are also equipped with inertial sensors 344 to measure translational and rotational velocities and accelerations of their attached moving objects. The local WiFi network 332 communicates received information and measurement data 328 with a WLAN management unit called WLAN manager 304. The WLAN manager 304 then directs the positioning measurement data 308 to the positioning engine 312 while it direct all the information and control data 324 to the service control system 320. The positioning engine 312 processes the received positioning measurement data 308 from the WLAN manager 304 to determine the present position and motion of the wireless terminal devices in the local coordinate system. The determined position and motion data 316 is then sent to the service control system 320 for other system control functions. The WLAN manager 304 also obtains application and operation data 324 from the service control system 320. Such application and operation data 324 is packaged into control data messages 328 and they will be sent via the local WiFi network 332 to the wireless service terminal devices 340, 348 and 352.

For the camera viewing system, both network based WiFi positioning system topology and terminal assisted WiFi positioning system topology can be used. In the network based topology, the RSS measurement is done centralized by WiFi network stations 332 rather than by the wireless service terminal devices. Beacons 336 for positioning purpose are sent from the mobile devices 340, 348 and 352 and they are received by the stations in local WiFi network 332. The RSS measurement is carried out at the stations based on their received beacon signal strength. On the other hand, in the terminal assisted WiFi positioning system topology, signal beacons are generated at the network stations in the local WiFi network 332. The RSS measurement is carried out at individual wireless service terminal devices 340, 348 and 352. These terminal devices then package the RSS measurement into positioning data messages and transmit the messages through the local WiFi network 332 to the WLAN manager 304. In both system topologies, the RSS measurement data is then redirected to the positioning engine 312. This engine has a location fingerprinting database that stores the RSS values that are obtained at different calibration points in the area of interest. In positioning application, a location estimation algorithm is used to estimate the present location based on the measured RSS values from a WiFi device at an unknown location and the previously created database of RSS map.

Typical smartphone and WiFi attachment device used in this system also have inertial measurement MEMS sensor 344 in it. The MEMS inertial sensor provides translational and rotation speed and acceleration measurement data. Such information data will be transmitted to the OTE 74 in service control system 70 to support object motion estimation and prediction. Furthermore, such a WiFi based local positioning system can also be integrated with GPS system to improve its positioning accuracy, especially in our-door application environments. In areas where a WiFi based local positioning system is not available, it can be replaced by the GPS system to provide the object positioning functionality.

Figure 8:
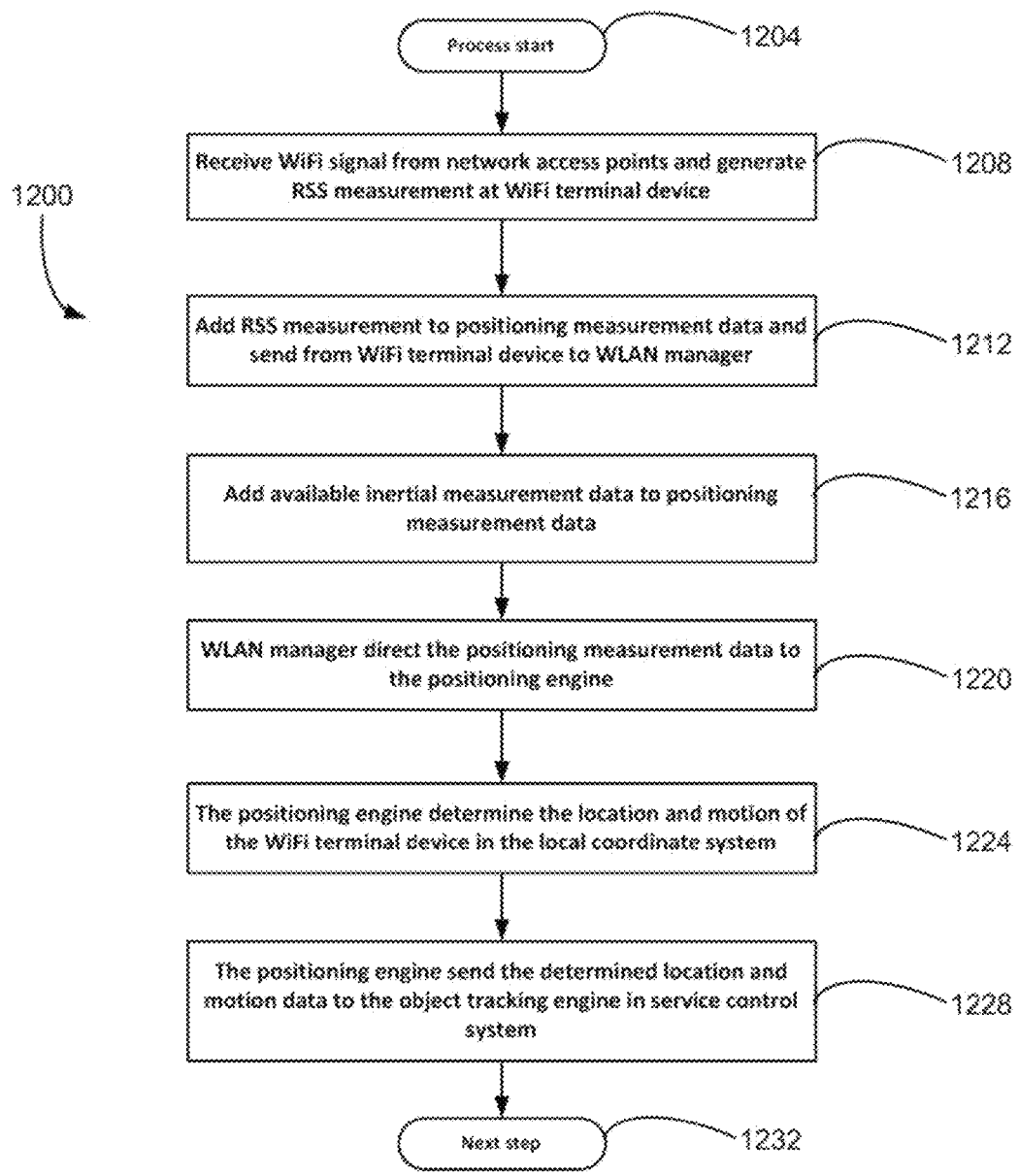
FIG. 8 is a flowchart illustrating a method for determining the position of a WiFi device using a WiFi based positioning system according to one or more embodiments.

With reference to FIG. 8, a WiFi positioning process to determine the location of a wireless service terminal device in the local coordinate system is illustrated in accordance with one or more embodiments and is generally referenced by numeral 1200. This exemplary embodiment of the WiFi position process assumes using the terminal assisted WiFi positioning system topology. The process starts at step 1204. It first receives WiFi signal from network access points and generate RSS measurement at WiFi terminal devices at step 1208. At step 1212, the RSS measurement is then added to the positioning measurement data. The positioning measurement data is sent from the WiFi terminal device to the WLAN manager via the local WiFi network. Optionally at step 1216, available inertial measurement data is added to the positioning measurement data to be transmitted to the WLAN manager. The WLAN manager directs the positioning measurement data to the positioning engine at step 1220. Based on pre-established local positioning map over the local coordinate system, the positioning engine determines the location and motion of the WiFi terminal device in the local coordinate system at step 1224. The determined location and motion data is then sent to the OTE 74 in the service center system 70 at step 1228. The process continues with new iterations of positioning process 1200 at step 1232.

Location fingerprinting based WiFi positioning systems usually work in two phases: calibration phase and positioning phase. The following descriptions use the network based WiFi positioning system topology as an exemplary embodiment to introduce the fingerprinting based positioning method. In the calibration phase, a mobile device is used to send out wireless signal beacons at a number of chosen calibration points. The RSS values are measured from several APs. Each measurement becomes a part of the radio map and is a tuple $(q_i, r_i)$, for i=1, 2, ..., n known calibration locations. $q_i=(x_i, y_i)$ are the coordinates of the i-th location in the local coordinate system. $r_i=(r_{i1}, r_{i2}, ..., r_{im})$ are the m RSS values measured from APs with respect to signal beacons sent out at the calibration location. In the positioning phase, a mobile device sends out signal beacon at an unknown location. The RSS values are measures from the APs and the positioning engine estimate the location using the previously created radio map and a weighted k-Nearest Neighbors algorithm for location fingerprinting. After that, the (x, y) coordinate of the unknown location is determined. The fingerprinting techniques usually do not require knowing exact locations of APs.

Vision based local positioning systems use camera to determine the location of a target object in the local coordinate system when the target object is presented in the camera view frames. In this system, picture frames from the camera view is transmitted to the local positioning system 54 together with the instantaneous camera platform position and motion including camera pan and tilt angles and angular rates, camera zooming ratio and rate, picture resolution, etc. This method consists of an absolute positioning technique and a relative positioning technique.

Figure 9:
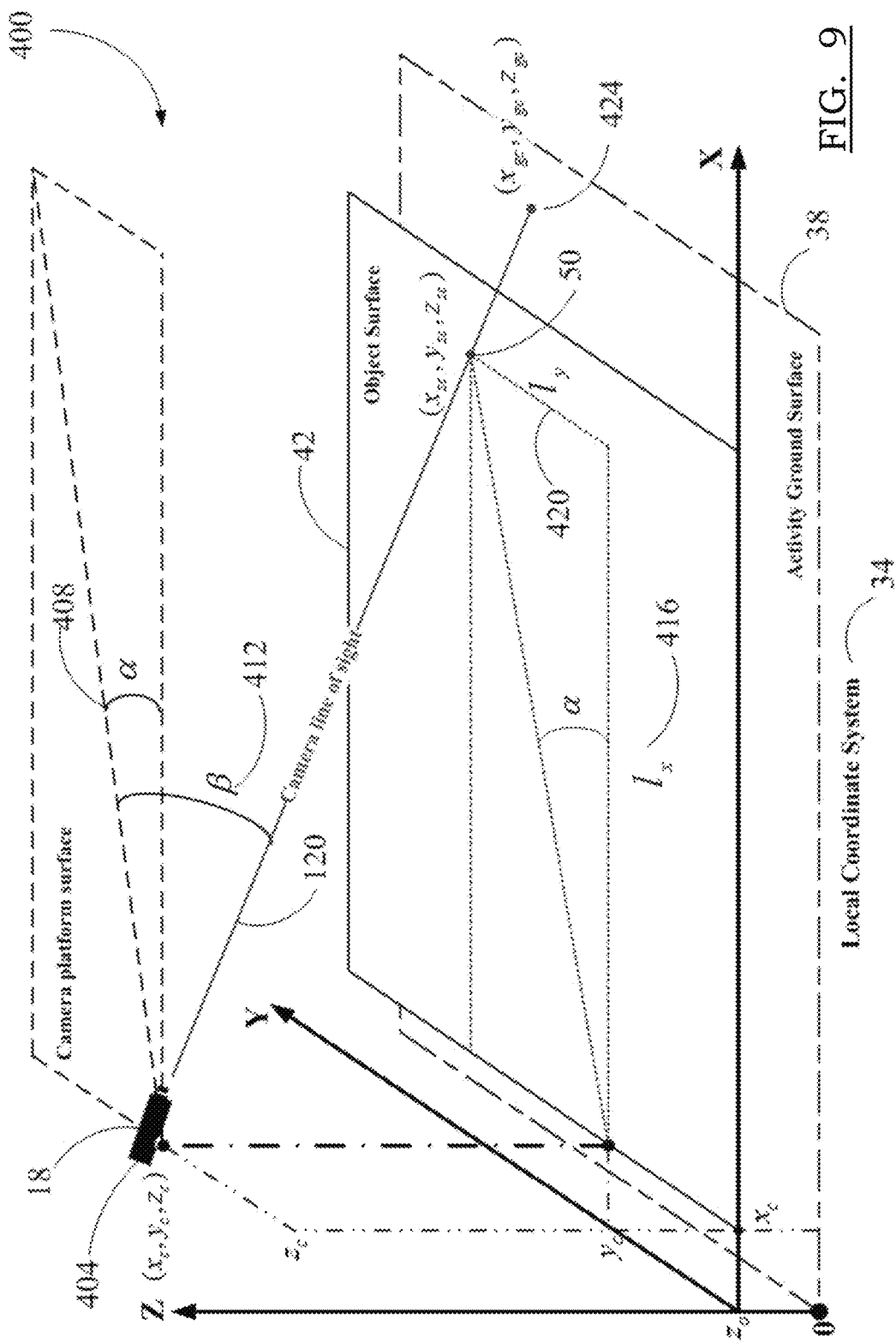
FIG. 9 is a schematic diagram of absolute vision based positioning method that is used to determine the aim-point position of a camera system in the local coordinate system according to one or more embodiments.

With reference to FIG. 9, a vision based local positioning system using absolute positioning technique is illustrated in accordance with one or more embodiments and is generally referenced by numeral 400. The absolute positioning technique determines the aim-point position 50 in the local coordinate system 34. It provides the fundamental coordinate transformation method between the local coordinate system and the camera system coordinate system of a physically pan-tilt camera system. The present coordinates $(x_c, y_c, z_c)$ 404 of the camera 18 can be either obtained from installation or be derived from the coordinates of camera platform in camera track coordinate system. The following description about vision based positioning is based on a known camera position in the local coordinate system. All the results can be easily extended to applications where a moving camera platform is used and $(x_c, y_c, z_c)$ is time varying.

Based on the estimated height $z_o$ of the target object above the ground surface 38, the height of the camera above the object surface 42 is: $h_c=z_c-z_o$. And the height of the camera above the ground surface 38 is: $h_g=z_c$. The height of the object above the ground is: $h_o=z_o$. The z-axis value for the ground surface is usually assumed to be zero. A surface plane at the height $z_o$ is called the object surface 42 and a surface plane at the height of $z_c$ is called camera platform surface. Both of the surfaces are parallel to the plane of activity ground.

According to the values of camera reported pan and tilt angles, the camera's heading angle α 408 and its overlook (look-down/look-up) angle β 412 can be derived. These two angles are usually linearly offset version of the pan and tilt angles of the camera system. The horizontal distance between the camera and the object on the object surface can be computed as: $l_x=h_c \cos α/\tan β$ denoted by numeral 416 and $l_y=h_c \sin α/\tan β$ denoted by numeral 420. The interception point of the camera line-of-sight 120 on the object surface 42 is the aim-point 50 at location $(x_{sc}, y_{sc}, z_{sc})$ where $(x_{sc}, y_{sc}, z_{sc})=(x_c+l_x, y_c+l_y, z_o)$ in the local coordinate system 34. Similarly, the camera aim-point 424 evaluated on the ground surface is: $(x_{gc}, y_{gc}, z_{gc})=(x_c+l_x^g, y_c+l_y^g, 0)$, where $l_x^g=h_g \cos α/\tan β$ and $l_y^g=h_g \sin α/\tan β$. Given the knowledge of $(x_{gc}, y_{gc}, z_{gc})$, the relationship between the aim-point $(x_{sc}, y_{sc}, z_{sc})$ and the present heading angle α and overlook angle β can be derived as:

$$(x_{sc}, y_{sc}, z_{sc}) = \left(x_{gc} + \frac{h_c - h_g}{\tan β}\cos α, y_{gc} + \frac{h_c - h_g}{\tan β}\sin α, z_0\right) \quad (1)$$

-continued $$\begin{bmatrix} \omega_\alpha \\ \omega_\beta \end{bmatrix} = \frac{1}{h} \begin{bmatrix} -\sin(\alpha)\tan(\beta) & \cos(\alpha)\tan(\beta) \\ -\cos(\alpha)\tan(\beta)^2 & -\sin(\alpha)\tan(\beta)^2 \end{bmatrix} \begin{bmatrix} u_{sc} \\ v_{sc} \end{bmatrix} \quad (2)$$

In this equation, $\omega_\alpha$ is the angular pan speed and $\omega_\beta$ is the angular tilt speed of the camera system in the camera system coordinate system. $[u_{sc}\ v_{sc}]$ is the velocity of the aim-point on the object surface. Equation (1) is used to determine the present aim-point position with respect to an object surface at height $z_o$ in LCS 34. Equation (2) is used to transform the aim-point velocity in LCS 34 to the desired pan-tilt speeds of the camera system in camera system coordinate system.

Figure 10:
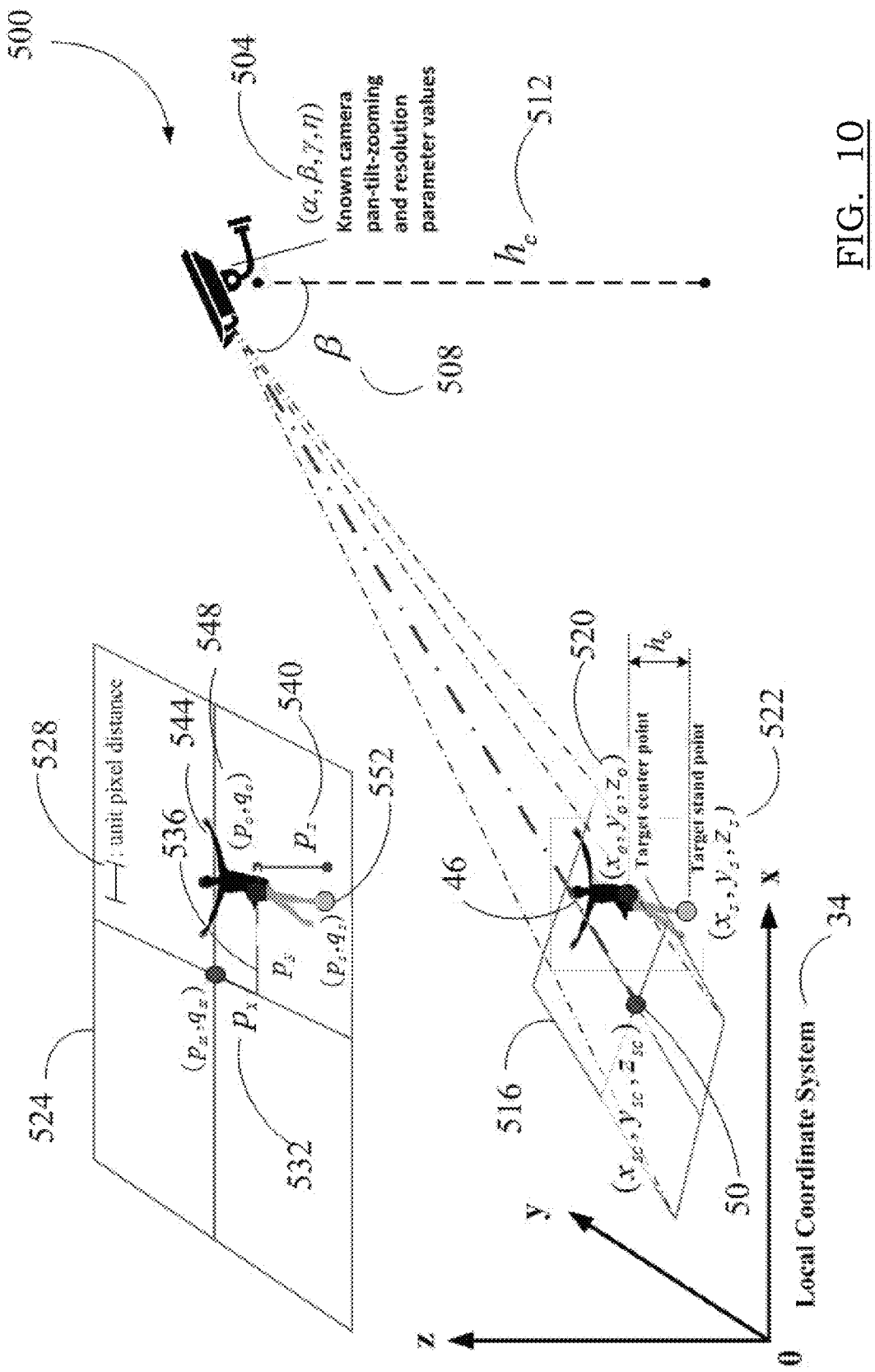
FIG. 10 is a schematic diagram of relative vision based positioning method that is used to determine the position of a target object captured in the local positioning system when the target object is captured in the video frame according to one or more embodiments.

The relative positioning technique is responsible for identifying the position of the characteristic points on an identified target object in the LCS 34. In the following, the target object's center position is used as representing characteristic point to demonstrate the method. The relative positioning is carried out in the camera video frames. With reference to FIG. 10, a method for the relative object positioning technique is illustrated in accordance with one or more embodiments and is generally referenced by numeral 500. The picture frame of the camera system has the following parameters: $\alpha$ is the heading angle 408 as in FIG. 9, $\beta$ is the tilt angle, $\gamma$ is zooming ratio and $\eta$ is the image frame resolution index. The camera tilt angle $\beta$, or equivalently the overlook angle, is also denoted by numeral 508. The camera system's height above the object surface is $h_c$ 512 and its height above the ground surface is $h_g$.

The camera system captures picture frame 524 that takes image of the area 516 in the local activity field. The camera has its aim-point 50 at position $(x_{sc}, y_{sc}, z_{sc})$ on the object surface. The target object 46 has many characteristic points to determine its position and motion. Frequently used characteristic points include the target center point 520 at $(x_o, y_o, z_o)$ and the target stand point 524 at $(x_s, y_s, z_s)$. The target center point's height is usually used to define the height of the object surface above the ground surface. The target stand point 522 is where the target object is on the ground surface.

The target object 46 on the camera picture frame 524 is denoted as 544 with center point 548 and stand point 552. The target center point 548 and the target stand point 552 have coordinates $(p_o, q_o)$ and $(p_s, q_s)$ in the camera frame coordinate system. Based on the tilt angle $\beta$, height above the surfaces $h_c$ or $h_g$, zooming parameter $\gamma$ and resolution parameter $\eta$, the unit image pixel distance $l_{psc}$ 528 near the frame center $(p_{sc}, q_{sc})$ can be obtained together with distance deflection ratio parameter $\rho_i$, for i=up, down, left, right. The corresponding position of the frame center in LCS 34 is the aim-point 50. The deflection ratios adjust the unit pixel distance when going away from the shooting point in four directions. Using the aim-point as the reference point in the camera frame coordinate, the planar distances of 532 and 536 of the object $(p_x, p_y)$ can be determined from the measurements of pixel difference between the identified object geometric center and the aim-point on the object surface:

$$p_j = l_{psc} \Sigma_{k=1}^{K_j}(k-1)^a \rho_i^{b(k-1)}, \text{ for } j=x,y \quad (2)$$

In this equation, parameter $a \in \{0,1\}$ and $b \in \{0,1\}$ determines the deflection ratio is linear or exponential. $\rho_i$ is used in the calculation depending on the relative position indicated by the value of $K_j$. $K_j$ is the number of pixels in x and y direction of the camera frame coordinate system between the aim-point and the object. For $K_x>0$, $\rho_{up}$ is used, otherwise $\rho_{down}$ is used. For $K_y>0$, $\rho_{right}$ is used, otherwise $\rho_{left}$ is used. After a coordinate transformation, the location of the object in the local coordinate system, $(x_o, y_o, z_o)$, can be determined with respect to the aim-point as:

$$(x_o, y_o) = (x_{sc}, y_{sc}) + \Pi_{f2l}(p_x, p_y) \quad (3)$$

$$\Pi_{f2l} = \begin{bmatrix} \sin\alpha & \cos\alpha \\ -\cos\alpha & \sin\alpha \end{bmatrix} \quad (4)$$

In the above equation, $\Pi_{f2l}$ is a coordinate transformation matrix from the camera frame coordinate to the local coordinate system 34. When the object stays in the object surface, $z_o = z_{sc}$.

$p_z$ is used to calculate the relative height 540 between the object center to its surface contact point $(x_s, y_s, z_s)$, that is, the difference between $z_o$ and $z_s$. Since in the height evaluation, the distance calculated is not on the ground surface, but perpendicular to the ground surface. A new set of parameters have to be used. These parameters include the unit pixel distance $l_{poc}$ around the object center and $\rho_i$, i=above, below, that determines the deflection ratio of object in the picture frame above and below the object center respectively. The object height is calculated as:

$$p_z = l_{poc}(\Sigma_{k=1}^{K_a}(k-1)^a \rho_{above}^{b(k-1)} + \Sigma_{k=1}^{K_b}(k-1)^a \rho_{below}^{b(k-1)}) \quad (5)$$

$K_a$ is the number of pixels between the center of the object and its ground contact point above the shooting point $(x_{sc}, y_{sc}, z_{sc})$ and $K_b$ is that below the shooting point. After $p_z$ is obtained, the ground surface contact point of the object is determined as: $(x_s, y_s, z_s) = (x_o, y_o, z_o - p_z)$. This method is also used during the camera channel initialization phase to determine the height of the object surface.

An alternative embodiment of the relative positioning technique applies 3D projection method to establish coordinate mapping between the three-dimensional local coordinate system 34 to a two-dimensional camera video frame coordinate system 258. In the presentation of the proposed invention, perspective transform is used as exemplary embodiment of the 3D projection method. A perspective transform formula is defined to map coordinates between 2D quadrilaterals. Using this transform, a point in the first quadrilateral surface (P, Q) can be transformed to a location (M, N) on the second quadrilateral surface using the following formula:

$$M = \frac{aP + bQ + c}{gP + hQ + 1} \quad (6)$$

$$N = \frac{dP + eQ + f}{gP + hQ + 1}$$

And a velocity vector $[u_P, u_Q]$ at point (P, Q) in the first quadrilateral surface can be transformed to a velocity vector $[u_M, u_N]$ at point (M, N) on the second quadrilateral surface using the following formula:

$$u_M = \frac{[(ah-gb)Q + (a-gc)]u_P + [(bg-ah)P + (b-ch)]u_Q}{(gP + hQ + 1)^2} \quad (7)$$

$$u_N = \frac{[(dh-ge)Q + (d-fg)]u_P + [(eg-dh)P + (e-fh)]u_Q}{(gP + hQ + 1)^2} \quad (8)$$

Where a, b, c, d, e, f, g, h are constant parameters whose value are determined with respect to selected quadrilateral area and surface to be transformed between the two surfaces in different coordinate system. After the positions of the characteristic points of a target object are identified in the camera video frame, equation (6) is used to locate their corresponding positions in the local coordinate system 34. In this case, the first quadrilateral is the image frame and the second quadrilateral is an area on a surface at a certain height $z_r$ in the LCS 34. The object surface or the ground surface is typically used. When digital PTZ is used in the camera viewing service system 10, equation (7) and (8) are used to transform the reference aim-point velocity $[u_{r_{ap}}, v_{r_{ap}}]$ in the local coordinate system to the digital pan and tilt velocity $[u_\alpha, u_\beta]$ 286 in the camera frame coordinate system 258.

For the vision based positioning technique, object location error is frequently caused by uncertain offsets and drifts in camera's orientation control and measurement devices. These uncertainties usually change from time to time. To compensate for the uncertain errors, assisted vision based positioning and position calibration methods are needed to assure the accuracy both for object location and for controlling camera orientation towards the target aim-point. To this end, this invention innovatively uses field characteristic points to refine the tuning of the camera orientation calibration and to serve as reference coordinate points to assist vision based object positioning in LCS 34. A field characteristic point is a marked point on the activity ground with known location in the local coordinate system. When captured into the camera's picture frame, a field characteristic point's known positions both in the local coordinate system and in the camera frame coordinate are used to calibrate the coordinate transformation formula and parameters. Single or multiple field characteristic points can be used. When multiple field characteristic points are available, the coordinate transformation parameters in equation (6) for coordinate transform between the local coordinate system and the camera frame coordinate system can be instantaneously identified, for example, using least square method or other parameter identification techniques.

Figure 11:
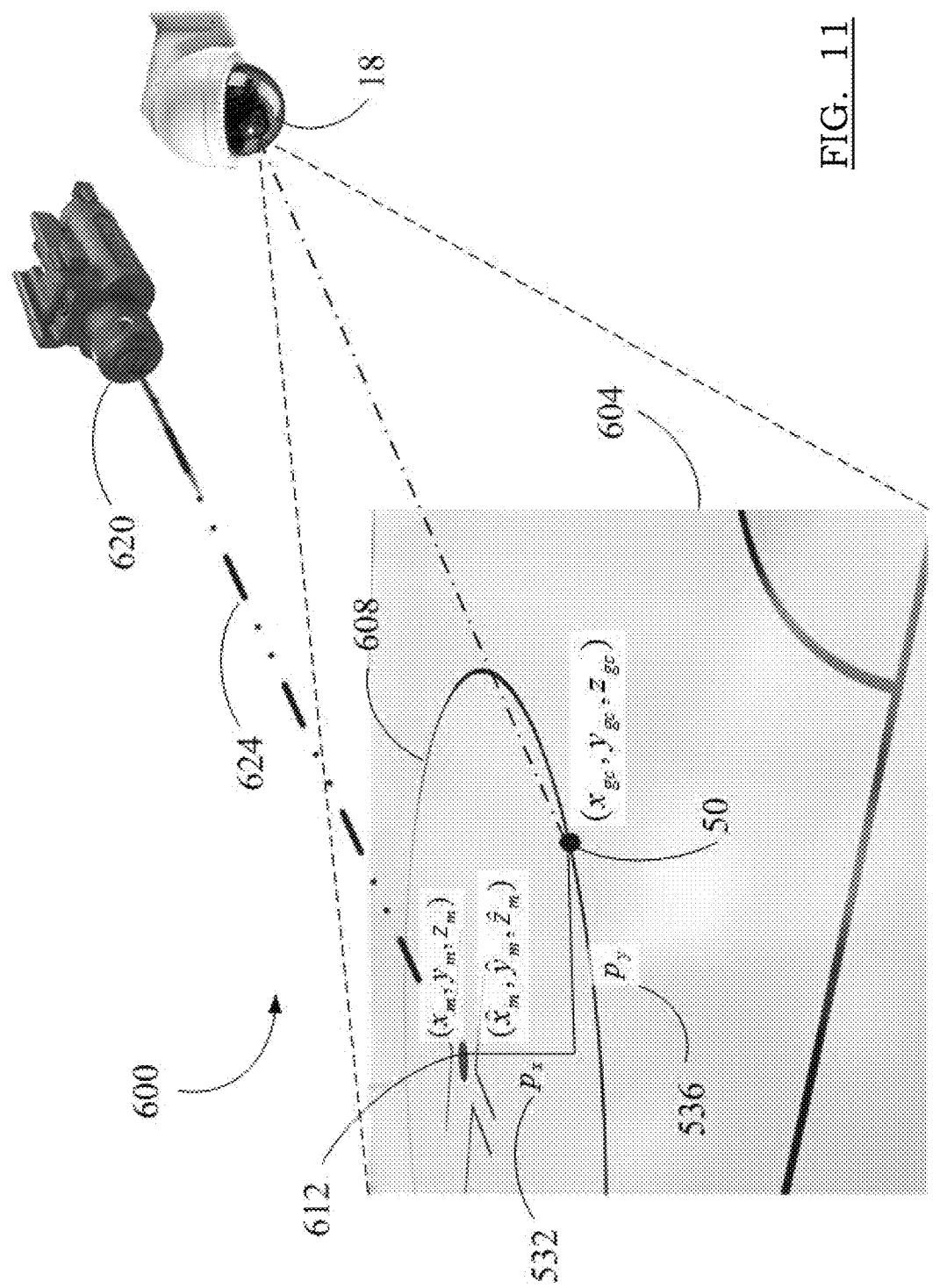
FIG. 11 is a schematic diagram of assisted vision based positioning method that uses field characteristic points with known coordinates both in the local coordinate system and in the video frame coordinate system to determine the position of a target object more accurately and to calibrate the vision based positioning system according to one or more embodiments.

With reference to FIG. 11, a method for the assisted vision positioning technique is illustrated in accordance with one or more embodiments and is generally referenced by numeral 600. In this exemplary embodiment, an end zone faceoff spot and circle 608 is captured by the camera view 604 over an ice rink. The faceoff spot 612 has its known coordinate $(x_m, y_m, z_m)$ on the ground surface plane in LCS 34. $Z_m = 0$ is typically used. Based on the camera's orientation and viewing parameters, camera aim-point 50 on the ground surface can be obtained as $(x_{gc}, y_{gc}, z_{gc})$ from the absolute positioning technique. The location of the faceoff point can be estimated from the relative positioning technique as $(\hat{x}_m, \hat{y}_m, \hat{z}_m)$. The difference between the estimated location of the faceoff spot and its known location $(x_m, y_m, z_m)$ are caused by uncertain camera orientation drift and offset errors. By applying the same vision based positioning mechanism in a reverse way, these offset and drift orientation parameters can be uniquely calculated using the field characteristic point positioning errors. Such positioning error at the field characteristic point is used to calibrate the relative vision positioning parameters and such positioning error at the aim-point is used to calibrate the absolute vision positioning parameters.

After the offset and drift compensation, the location of the characteristic filed point will be reevaluated to obtained a new location error result. Such a calibration and reevaluation process will be iterated until the location error at the field characteristic point is less than a precision threshold. Such a calibration method can be used both offline and online. Furthermore, in order to actively generate desired field characteristic points in vision positioning assistance, laser pointer device 620 can be used to actively generate field characteristic points on the activity ground by laser beams 624. In this way, the field characteristic point can be selected and arranged more freely with desired numbers of points to enhance the positioning precision for identified objects in the camera picture frame.

Figure 12:
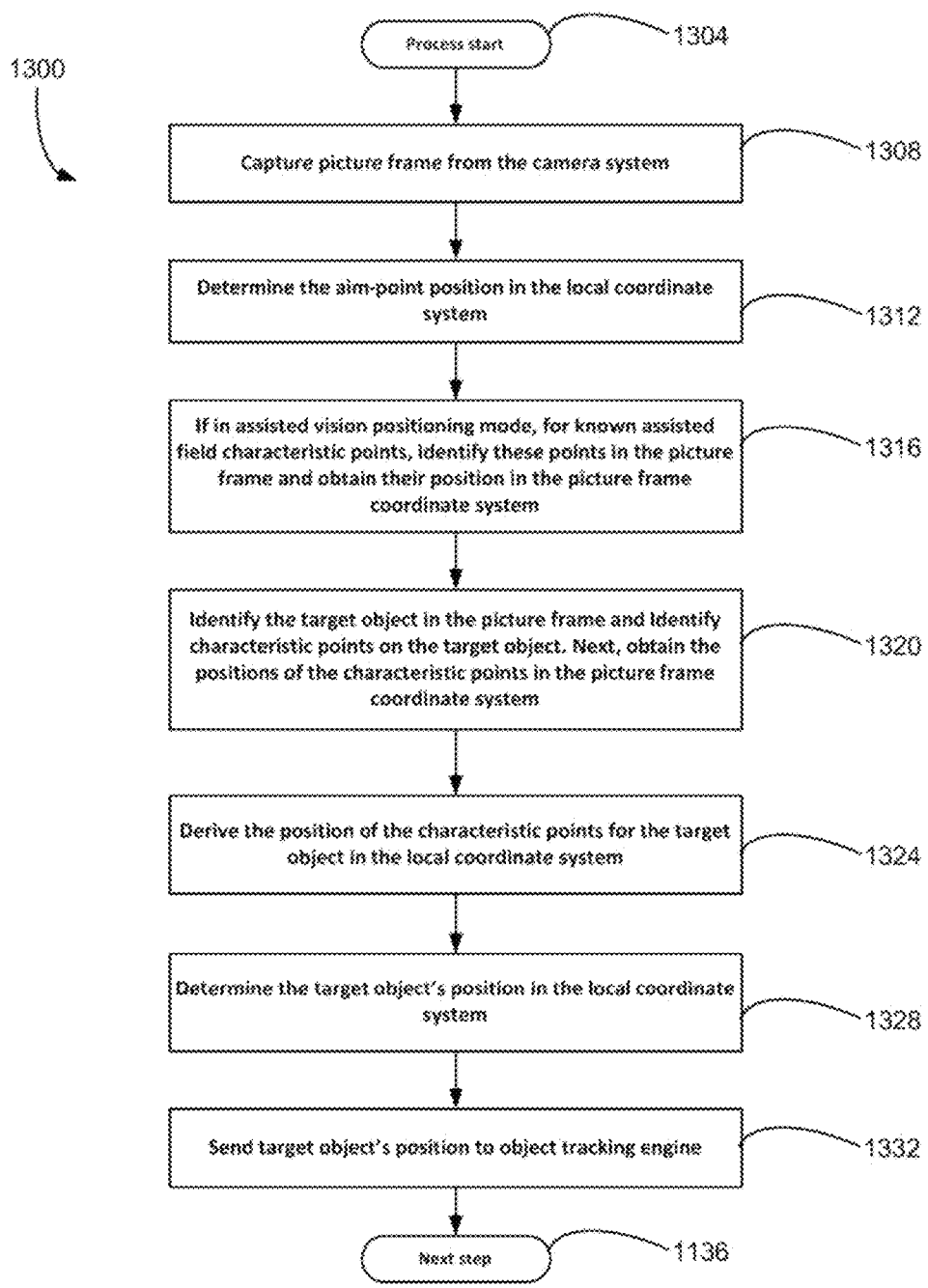
FIG. 12 is a flowchart illustrating a method for process and determine the position of a target object in the local positioning system using vision based positioning method according to one or more embodiments.

With reference to FIG. 12, an exemplary embodiment of the vision positioning process to determine the location of an object captured in the camera picture frame is illustrated in accordance with one or more embodiments and is generally referenced by numeral 1300. The process starts at step 1304. While capturing a picture frame from the camera system at step 1308, the position of the camera aim-point in the local coordinate system is determined using the absolution positioning technique at step 1312. Optionally at step 1316, if in assisted vision positioning mode, identify field characteristic points in the picture frame and obtain their positions in the picture frame coordinate system. Based on the known positions of the field characteristic points in the local coordinate system, coordinate transformation formula and parameters can be identified and calibrated between the local coordinate system and the camera frame coordinate. Next, the target object is identified in the picture frame with object characteristic points identified on the target object. The positions of the object characteristic points are obtained in the camera frame coordinate at step 1320. The positions of the object characteristic points in the local coordinate system are then derived at step 1324 using the coordinate transform method established from the absolute positioning technique, the relative positioning technique and the assisted vision positioning method. After that, the position of the target object in the local coordinate system can be determined from the positions of the object characteristic points at step 1328. A simplest method is to use the position of the target center point to represent the position of the target object. For target object that comprises multiple individual objects, each of the objects is used as an object characteristic point and the position of the target object can be derived from the positions of these objects using their mass center, geometric center, boundary points, etc. At step 1332, the determined target object's position data is sent to the object tracking engine 74 to support target position and motion estimation. The process continues at step 1136 with next iteration of the vision based positioning process 1300.

Figure 13:
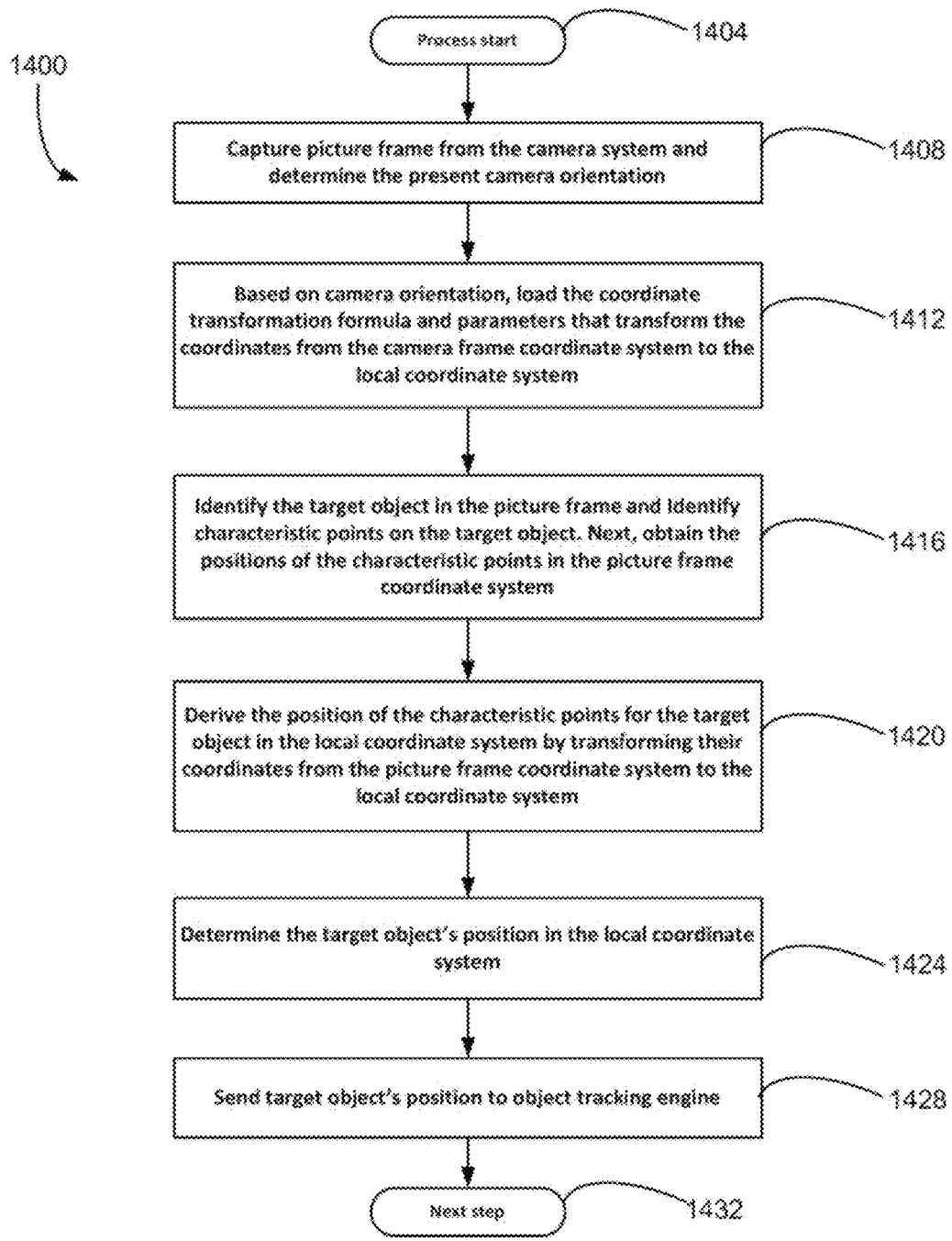
FIG. 13 is a flowchart illustrating a method for process and determine the position of a target object in the local positioning system using coordinate transform method in vision based positioning according to one or more embodiments.

With reference to FIG. 13, an alternative embodiment of the vision positioning process to determine the location of an object captured in the camera picture frame is illustrated in accordance with one or more embodiments and is generally referenced by numeral 1400. The process starts at step 1404. While capturing a picture frame from the camera system, the present camera system orientation is obtained in the camera system coordinate system at step 1408. Based on the camera system orientation data, predetermined and calibrated coordinate transformation formula, like the perspective transform equation (6), and its parameters are loaded from a database at step 1412. 3D projection transformation methods are used for such transformation formula to convert positions between the camera frame coordinate and the local coordinate system. Perspective transform and estimation method is an exemplary embodiment of the 3D projection transformation methods for the transformation formulation and parameter identifications. Next, the target object is identified in the picture frame with object characteristic points identified on the target object. The positions of the object characteristic points are obtained in the camera frame coordinate at step 1416. The positions of the object characteristic points in the local coordinate system are then derived at step 1420 using the coordinate transformation formula and parameters at loaded step 1412. Similar to steps in 1328 and 1332 in the first embodiment of the vision positioning process, the position of the target object in the local coordinate system is determined and sent to the object tracking engine 74 at step 1424 and 1428. After that, the process continues at step 1432 with next iteration of the vision based positioning process 1400.

Figure 14:
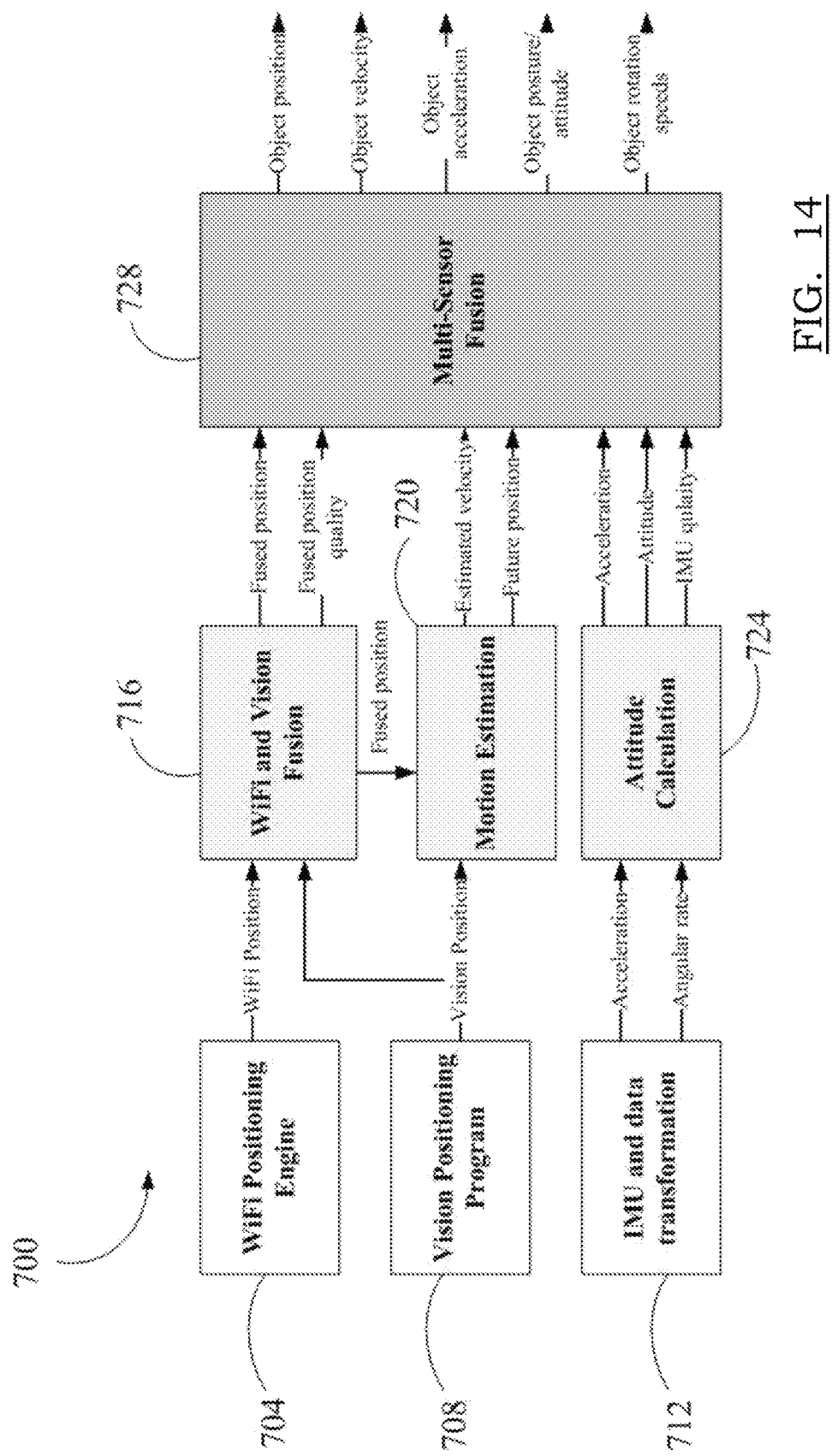
FIG. 14 is a schematic diagram of a Bayes filter based position and motion estimation method for target object location and tracking according to one or more embodiments.

After the position of a target object 46 in LCS 34 is determined, the target object's motion and future position can be estimated using Bayes filter technology. With reference to FIG. 14, an exemplary embodiment of the object position and motion estimation method implemented in OTE 74 is illustrated in accordance with one or more embodiments and is generally referenced by numeral 700. The WiFi positioning engine 704 contains the WiFi based positioning method 1200 and it outputs the WiFi positioning data about its determined position of the target object in LCS 34. The Vision positioning program 708 contains the vision based positioning methods 1300 and 1400 and it outputs the determined position of the target object in LCS 34. Beside the WiFi and Vision based target object location estimation methods, a dead reckoning type of positioning method can also be used to further enhance the accuracy and reliability of the target object position and attitude estimation when an Inertial Measurement Unit (IMU) 60 is attached. The IMU and data transformation module 712 outputs acceleration and angular rate measurements associated to the target object.

Typical low-cost MEMS-based IMU is inaccurate and can diverge very fast over time due to typical intrinsic errors like bias, misalignment and scaling. However, the IMU has the advantage of high availability, high data rate, and it is immune to external disturbances. In contrast to the IMU system, the positioning rate of the fingerprinting-based WiFi positioning system is comparably low and susceptible to external disturbances which lead to erratic, but bounded positioning errors. So is the image frame based vision positioning system. Due to the complementary error behavior, data fusion of WiFi, Vision and IMU positioning systems is appropriate. This invention applies a WiFi/Vision/IMU Multi-sensor fusion algorithm. Contextual variables are introduced to define fuzzy validity domains of each sensor. The algorithm increases the reliability of the position information. Bad data delivered by individual sensor are detected and rejected using contextual information thus increasing reliability.

When both a WiFi based positioning system and a vision based positioning system are used in the camera viewing service system 10, the obtain positions of a target object from both positioning systems need to be jointed together through a position fusion algorithm call WiFi and Vision Fusion 716. Let $C_w$ and $C_v$ denote the object location estimated from the WiFi positioning technique and the vision based positioning technique, respectively. Their associated noise variances are $\sigma_w^2$ and $\sigma_v^2$. By applying the Central Limit Theorem, the combined object location estimation C is obtained as:

$$C_{wv} = \sigma_c^2(\sigma_w^{-2}C_w + \sigma_v^{-2}C_v) \qquad (9)$$

where $\sigma_{wv}^2 = (\sigma_w^2 + \sigma_v^2)^{-1}$ is the variance of the combined estimate. It can be seen that the fused result is simply a linear combination of the two measurements weighted by their respective noise variances. Alternatively, Kalman filter can be used to fuse together the WiFi and Vision position estimations by applying a first-order system. Particle filters and Hiden Markov Model can also be used to improve the positioning accuracy. The Hiden Markov Model is a statistical model allows the system to integrate the likelihood of a movement or positional change. The fusion of the target object positioning results from both the WiFi positioning engine and the vision positioning algorithm generates a higher accurate and reliable target object location ($\bar{x}_o$, $\bar{y}_o$, $\bar{z}_o$). An estimation quality may also be generated and it will be sent to the Multi-Sensor Fusion module 728 together with the fused target object's position data.

The WiFi positioning engine is independent to the vision based positioning algorithm. It is especially useful when the vision based target object position is not available. This happens frequently in the camera viewing initialization phase when the target object has not been specified for the vision based positioning system in its video frames. During the camera viewing initialization phase, the service user's location from the WiFi positioning engine is used to quickly adjust the camera orientation and zooming to focus the camera view on the user before the target object is defined in the camera view. During automatic camera view following control phase, obstruction frequently happen and the subsequent vision based object location estimation loss is reliability and accuracy. In this case, the weighting on the WiFi positioning result is largely increased. The attachment of a WiFi device makes it easy to locate the target object even in crowds. The WiFi positioning engine not only provide continuous object location estimation, but also provide information to help the vision processing quickly identify and locate the target object from the camera view frames. In the presence of uncertainties, the target object can be distinguished from the other objects by using its WiFi based location information to find the object at the corresponding place on the image frames.

Based on the fusion result obtained for the target object's location ($\bar{x}_o$, $\bar{y}_o$, $\bar{z}_o$), the motion velocity of the target object is done using the Kalman Filter based estimation method called Motion Estimation 720. It is necessary to point out that the motion estimation 720 can use either the raw positioning data only the positioning data ($x_o$, $y_o$, $z_o$) or the fused positioning data depending on availability. In the second case, the distance vector ($e_x$, $e_y$, $e_z$) between the target object and the camera aim-point is calculated using ($\bar{x}_o$, $\bar{y}_o$, $\bar{z}_o$) instead of ($x_o$, $y_o$, $z_o$).

In the proposed invention, after the position of the target object in the local coordinate system is determined by the local positioning system, the object tracking engine 74 uses a Bayes filter for calculating the probabilities of multiple beliefs to continuously update the most likely position and motion of the target object within the local coordinate system, based on the most recently acquired positioning results. This is a recursive algorithm. It consists of two parts: prediction and innovation. Exemplary embodiments of the Bayes filter are a Kalman Filter (KF) and a Particle filter. A Kalman filter is a recursive Bayesian filter for multivariate normal distributions and a Particle filter is a sequential Monte Carlo (SMC) based technique, which models the probability density function using a set of discrete points. In the following presentation of the proposed invention, a Kalman filter is used as the exemplary embodiment of the Bayes filer to present the design of the object tracking engine 74.

The motion estimation 720 is designed using a Kalman Filtering algorithm for a discrete-time linear system state transition model:

$$x(k+1)=Fx(k)+\omega(k) \quad (10)$$

$x(k)\in\mathbb{R}^n$ is the state vector, $\omega(k)\in\mathbb{R}^n$ is a sequence of zero mean white Gaussian noise of assumed known covariance matrix $Q(k)=E[\omega(k)\omega^T(k)]$. $F\in\mathbb{R}^{n\times n}$ is the known state transition matrix. In the simplest case, measurements are expressed as a linear relation with respect to the state space variables and are corrupted by noise. The following relationship describes the measurement $$y(k)=Cx(k)+e(k) \quad (11)$$

With $z(k)\in\mathbb{R}^l$ the measurement vector, $e(k)\in\mathbb{R}^l$ the white Gaussian observation noise with zero mean and with covariance matrix $R(k)=E[e(k)e^T(k)]$, $C\in\mathbb{R}^{l\times n}$ is the measurement matrix. The KF can be computed as an estimation stage and a prediction stage.

The estimation stage:

$$\hat{x}(k|k)=\hat{x}(k|k-1)+K(k)[y(k)-C\hat{x}(k|k-1)] \quad (12)$$

with $$K(k)=P(k|k-1)C^T(CP(k|k-1)C^T+R(k))^{-1}$$

$$P(k|k)=(I-K(k)C)P(k|k-1)$$

The prediction stage is defined by the following equations:

$$\hat{x}(k+1|k)=F\hat{x}(k|k) \quad (13)$$

$$P(k+1|k)=FP(k|k)F^T+Q(k)$$

During camera view following a target object, the location of the object is continuously estimated from the camera view frames while the camera orientation is continuously adjusted to keep the object in view. Based on the camera motion and object positioning, the motion states of the target object can be further estimated. This velocity vector is defined in the local coordinate system with u, v, w represent the speeds along the x, y, z axis respectively. In this method, the velocity $(u_{sc}, v_{sc}, w_{sc})$ of the camera aim-point 50 on the object surface is first derived from the camera's pan-tilt and zooming speeds. For example, given the knowledge of the pan angle $\alpha$ and tilt angle $\beta$, the plane motion on a surface has the following relationship between the translational velocity of the camera shooting point $(x_{sc}, y_{sc})$ and the angular speeds of camera pan and tilt motion $(\omega_\alpha, \omega_\beta)$:

$$\begin{bmatrix} u_{sc} \\ v_{sc} \end{bmatrix} = \Psi_v \begin{bmatrix} \omega_\alpha \\ \omega_\beta \end{bmatrix} = \begin{bmatrix} \frac{-h\sin\alpha\tan\beta}{\tan^2\beta} & \frac{-h\cos\alpha}{\sin^2\beta} \\ \frac{h\cos\alpha\tan\beta}{\tan^2\beta} & \frac{-h\sin\alpha}{\sin^2\beta} \end{bmatrix} \begin{bmatrix} \omega_\alpha \\ \omega_\beta \end{bmatrix} \quad (14)$$

where $\Psi_v(\alpha,\beta,h)$ is a camera orientation and position dependent time varying velocity transformation matrix. h is the height of the camera above the surface. $w_{sc}=0$ for planar motion.

For the Kalman Filter, the velocity of the object in the local positioning coordinate is: $(u_o, v_o, w_o)$. Define the estimator dynamic state as: $x=[e_x, e_y, e_z, \epsilon_x, \epsilon_y, \epsilon_z]$, where $e_i=i_o-i_{sc}$, for i=x, y, z and $\epsilon_j=j_o-j_{sc}$, for j=u, v, w. The state transition matrix of the discrete time process is:

$$F = \begin{bmatrix} I_3 & \tau I_3 \\ 0_3 & I_3 \end{bmatrix} \quad (15)$$

$\tau$ is the discrete execution cycle time for the Kalman filter implementation. $I_3$ is the identity matrix or unit matrix of size 3. $0_3$ is the zero matrix of size 3. The measurement of the system is: $y=(e_x, e_y, e_z)$. The output of the Kalman filter is the velocity error vector $(\epsilon_x, \epsilon_y, \epsilon_z)$. Based on this estimation, the velocity of the target object can be obtained as:

$$(u_o, v_o, w_o)=(u_{sc}+\epsilon_x, v_{sc}+\epsilon_y, w_{sc}+\epsilon_z) \quad (16)$$

In the prediction stage, $(\hat{e}_x, \hat{e}_y, \hat{e}_z)$ is obtained using equation (13) such that a future position of the target object is obtained as:

$$(\hat{x}_o, \hat{y}_o, \hat{z}_o)=(x_{sc}+\hat{e}_x, y_{sc}+\hat{e}_y, z_{sc}+\hat{e}_z) \quad (17)$$

In the above formulation of the KF based motion estimation 720, the camera aim-point position and motion may not be needed to derive the target object's position and motion. In this case $i_{sc}=0$, for i=x, y, z and $j_{sc}=0$, for j=u, v, w are used. The estimated target object's motion and future position are then sent to module 728 to finalize the target object tracking results.

The most essential contribution of IMU to the vision positioning is the attitude. The simple and rough facing direction estimation from the vision processing can be quite inaccurate if the environment is changing fast and the position fixes are noisy. With the inclusion of inertial sensors, the attitude can be determined independently of external disturbances in the Attitude Calculation function 724 with the acceleration data, attitude data and associated quality data outputs to support the multi-sensor fusion 728.

The multi-sensor fusion module 728 is responsible for fuse the raw and processed information obtained from the positioning systems 704 and 708 as well as the dead reckoning based positioning method in order to generate final high quality position and movement information for the tracked target objects. To this end, the multi-sensor Kalman Filtering algorithm is provided as follows: consider a discrete-time linear system state transition model:

$$x(k+1)=Fx(k)+\omega(k) \quad (18)$$

$x(k)\in\mathbb{R}^n$ is the state vector, $\omega(k)\in\mathbb{R}^n$ is a sequence of zero mean white Gaussian noise of assumed known covariance matrix $Q(k)=E[\omega(k)\omega^T(k)]$. $F\in\mathbb{R}^{n\times n}$ is the known state transition matrix. In the simplest case, measurements are expressed as a linear relation with respect to the state space variables and are corrupted by noise. The following relationship describes the measurements for a set of N sensors $$z_i(k)=H_ix(k)+b_i(k), i=1\ldots N \quad (19)$$

With $z_i(k)\in\mathbb{R}^l$ the measurement vector of the sensor i, $b_i(k)\in\mathbb{R}^l$ the white Gaussian observation noise for the sensor i with zero mean and with assumed known covariance matrix $R_i(k)=E[b_i(k)b_i^T(k)]$, $H_i\in\mathbb{R}^{l\times n}$ is the measurement matrix associated to the sensor. The multi-sensor KF can be computed as an estimation stage and a prediction stage.

The estimation stage:

$$\hat{x}(k|k)=\hat{x}(k|k-1)+\Sigma_{i=1}^N K_i(k)[z_i(k)-H_i\hat{x}(k|k-1)] \quad (20)$$

with $$K_i(k)=P(k|k)H_i^T R_i^{-1}(k)$$

The Kalman gain for the data fusion associated to the sensor i, the quantity $z_i(k)-H_i\hat{x}(k|k-1)=v_i(k)$ is called the innovation associated to the observation from the sensor i. The uncertainty on the estimate is given by the matrix:

$$P^{-1}(k \mid k) = P^{-1}(k \mid k-1) + \sum_{i=1}^{N} H_i^T R_i^{-1}(k) H\_i$$

The prediction stage is defined by the following equations:

$$\hat{x}(k+1 \mid k) = F\hat{x}(k \mid k) \quad (21)$$

$$P(k+1 \mid k) = FP(k \mid k)F^T + Q(k)$$

For the multi-sensor fusion module 728, a Wiener process acceleration model is considered for the standard state model of the Kalman Filter algorithm. It is a basic model giving a good compromise between complexity and performance in the modeling of a target object's motion dynamics. $x(k) \in \mathbb{R}^9$ is the state vector representing position, velocity and acceleration in the local positioning coordinate system. In such a model, F and ω are:

$$F = \begin{pmatrix} I_3 & \tau I_3 & \frac{\tau^2}{2} I_3 \\ 0_3 & I_3 & \tau I_3 \\ 0_3 & 0_3 & I_3 \end{pmatrix} \text{ and } \omega(k) = \begin{pmatrix} \frac{\tau^3}{6} B \\ \frac{\tau^2}{2} B \\ \tau B \end{pmatrix} \gamma(k) \text{ with } B = \begin{pmatrix} 1 \\ 1 \\ 1 \end{pmatrix}$$

$\gamma(k) \in \mathbb{R}$ a zero mean white Gaussian noise of assumed known covariance.

Observations given by the sensors are, in the local coordinate system frame. The target object's position is from the fusion result from the WiFi and vision location estimations, i.e. $(\bar{x}_o, \bar{y}_o, \bar{z}_o)$. The velocity is from the motion state estimation $(u_o, v_o, w_o)$. The acceleration is from the IMU. The latter is obtained by transforming data given by accelerometers (corrected from biases and scale factors by internal algorithm of the IMU) from the object body frame to the local coordinate system frame, using measurements of rotational speeds. The measurement models are:

$$z_{FWV}(k) = H_{FWV}(k)x(k) + b_{FWV}(k), H_{FWV} \quad (22)$$
$$= \begin{pmatrix} I_3 & 0_3 & 0_3 \\ 0_3 & 0_3 & 0_3 \\ 0_3 & 0_3 & 0_3 \end{pmatrix}$$

$$z_{VSE}(k) = H_{VSE}(k)x(k) + b_{VSE}(k), H_{VSE} \quad (23)$$
$$= \begin{pmatrix} 0_3 & 0_3 & 0_3 \\ 0_3 & I_3 & 0_3 \\ 0_3 & 0_3 & 0_3 \end{pmatrix}$$

$$z_{IMU}(k) = H_{IMU}(k)x(k) + b_{IMU}(k), H_{IMU} \quad (24)$$
$$= \begin{pmatrix} 0_3 & 0_3 & 0_3 \\ 0_3 & 0_3 & 0_3 \\ 0_3 & 0_3 & I_3 \end{pmatrix}$$

In the above equations, subscript FWV stands for "Fusion of WiFi and Vision" and VSE stands for "Velocity State Estimation". $b_i(k)$ is zero mean white Gaussian noises of respectively assumed known covariance $R_i(k)$ for i=FWV, VSE, IMU, respectively.

Estimate at time k is obtained by weighting, using the β masses defined by the contextual variables, the estimates obtained with the different sensor associations. The estimate obtained by fusing the position and IMU data is:

$$\hat{x}_{WVI} = \hat{x}(k \mid k-1) + K_{FWV}(k)(z_{FWV}(k) - H_{FWV}\hat{x}(k \mid k-1) + K_{VSE}(k)(z_{VSE}(k) - H_{VSE}\hat{x}(k \mid k-1) + K_{IMU}(k)(z_{IMU}(k) - H_{IMU}\hat{x}(k \mid k-1)) \quad (25)$$

$$K_{FWV}(k) = P_{WVI}(k \mid k)(H_{FWV})^T (R_{FWV})^{-1}$$

$$K_{VSE}(k) = P_{VSE}(k \mid k)(H_{VSE})^T (R_{VSE})^{-1}$$

$$K_{IMU}(k) = P_{GI}(k \mid k)(H_{IMU})^T (R_{IMS})^{-1}$$

$$(P_{WVI}(k \mid k))^{-1} = P^{-1}(k \mid k-1) + (H_{FWV})^T (R_{FWV})^{-1} H_{FWV} + (H_{VSE})^T (R_{VSE})^{-1} H_{VSE} (H_{IMU})^T (R_{IMU})^{-1} H_{IMU}$$

φ weightings are then calculated using membership functions. The final estimate is determined by:

$$\hat{x}(k \mid k) = \phi_o \hat{x}(k \mid k-1) + \phi_{FWV} \hat{x}_{FWV}(k \mid k) + \phi_{VSE} \hat{x}_{VSE}(k \mid k) + \phi_{WVI} \hat{x}_{WVI} \quad (26)$$

In this equation, $\hat{x}_{FWV}(k \mid k) = (\bar{x}_o, \bar{y}_o, \bar{z}_o)$ and $\hat{x}_{VSE}(k \mid k) = (u_o, v_o, w_o)$. After the sensor fusion, the estimated position, future position and velocity of the target object is finally obtained as:

$$(\bar{x}_o, \bar{y}_o, \bar{z}_o)^T = H_{FWV} \hat{x}(k \mid k) \quad (27)$$

$$(x_{to}, y_{to}, z_{to})^T = H_{FWV} \hat{x}(k+1 \mid k) = H_{FWV} F \hat{x}(k \mid k) \quad (28)$$

$$(u_{to}, v_{to}, w_{to})^T = H_{VSE} \hat{x}(k \mid k) \quad (29)$$

This estimated target object velocity and future position is used for camera orientation control to determine a target aim-point position in LCS 34.

Figure 15:
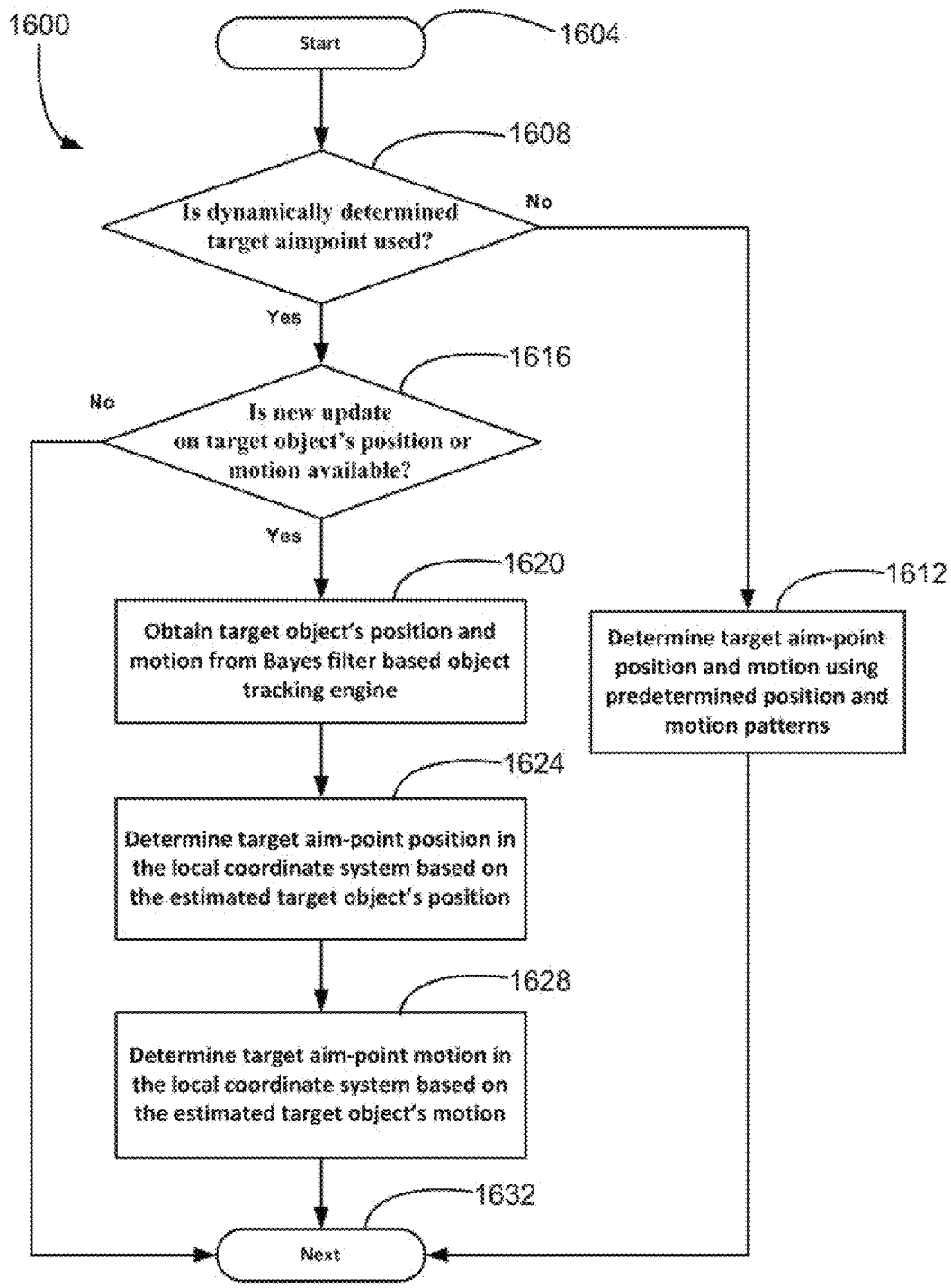
FIG. 15 is a flowchart illustrating a method for target aim-point's position and motion determination based on the estimated target object's position and motion according to one or more embodiments.

With reference to FIG. 15, a method for determining the position and motion of the target aim-point is illustrated in accordance with one or more embodiments and is generally referenced by numeral 1600. After starting at step 1604, the process first checks if dynamically determined target aim-point is to be used in the present operation at step 1608. If not, the process next determines the target aim-point position and motion using predetermined position ad motion at step 1612. For example, the target aim-point position is at the center location of the activity field at zero velocity constantly, which results that the camera viewing service system provides views centered at the activity field center continuously. Otherwise, if the dynamically determined target aim-point is used at step 1608, the process next check on if new update on target object's position and motion is available at step 1616. Before a new update is received, the method keeps its present determined position and motion for the target aim-point and it continues to step 1632. Once informed that a new update on target object's position or motion is available, the process goes to step 1620 and obtains the updated information. The target aim-point position is then determined at step 1624 based on the estimated target object's position in the local coordinate system 34 as:

$$\begin{bmatrix} x_{tap} \\ y_{tap} \\ z_{tap} \end{bmatrix} = \begin{bmatrix} x_{to} + x_{ofs} \\ y_{to} + y_{ofs} \\ z_{to} + z_{ofs} \end{bmatrix} \quad (28)$$

Parameters $x_{ofs}$, $y_{ofs}$, $z_{ofs}$ add offset to the target object's position $(x_{to}, y_{to}, z_{to})$ to determine the target aim-point position $(x_{tap}, y_{tap}, z_{tap})$. $(x_{ofs}, y_{ofs}, z_{ofs}) = (0,0,0)$ is used by default to set the target aim-point position right at the identified target object position in the local coordinate system. This step is bypassed if the updated target object's information does not contain new position information.

The process 1600 next goes to step 1628 to determine the target aim-point motion in the local coordinate system as:

$$\begin{bmatrix} u_{tap} \\ v_{tap} \\ w_{tap} \end{bmatrix} = \begin{bmatrix} k_u u_{to} + u_{ofs} \\ k_v v_{to} + v_{ofs} \\ k_w w_{to} + w_{ofs} \end{bmatrix} \quad (29)$$

Parameters $k_i$ and $i_{ofs}$, i=u, v, w, linearly rescale and offset the target object's velocity ($u_{to}$, $v_{to}$, $w_{to}$) to determine the target aim-point velocity ($u_{tap}$, $v_{tap}$, $w_{tap}$) By default, $k_i=1$ and $i_{ofs}=0$ are used such that the target aim-point moves at the same velocity in the local coordinate system such that the camera view is basically following the target object. Non-zero parameter values are used when relative adjustments on the target aim-point's position and motion with respect to a target object is needed. This step is bypassed if the updated target object's information does not contain new velocity information. After that, the process continues with a new iteration of the method 1600 at step 1632.

Figure 16:
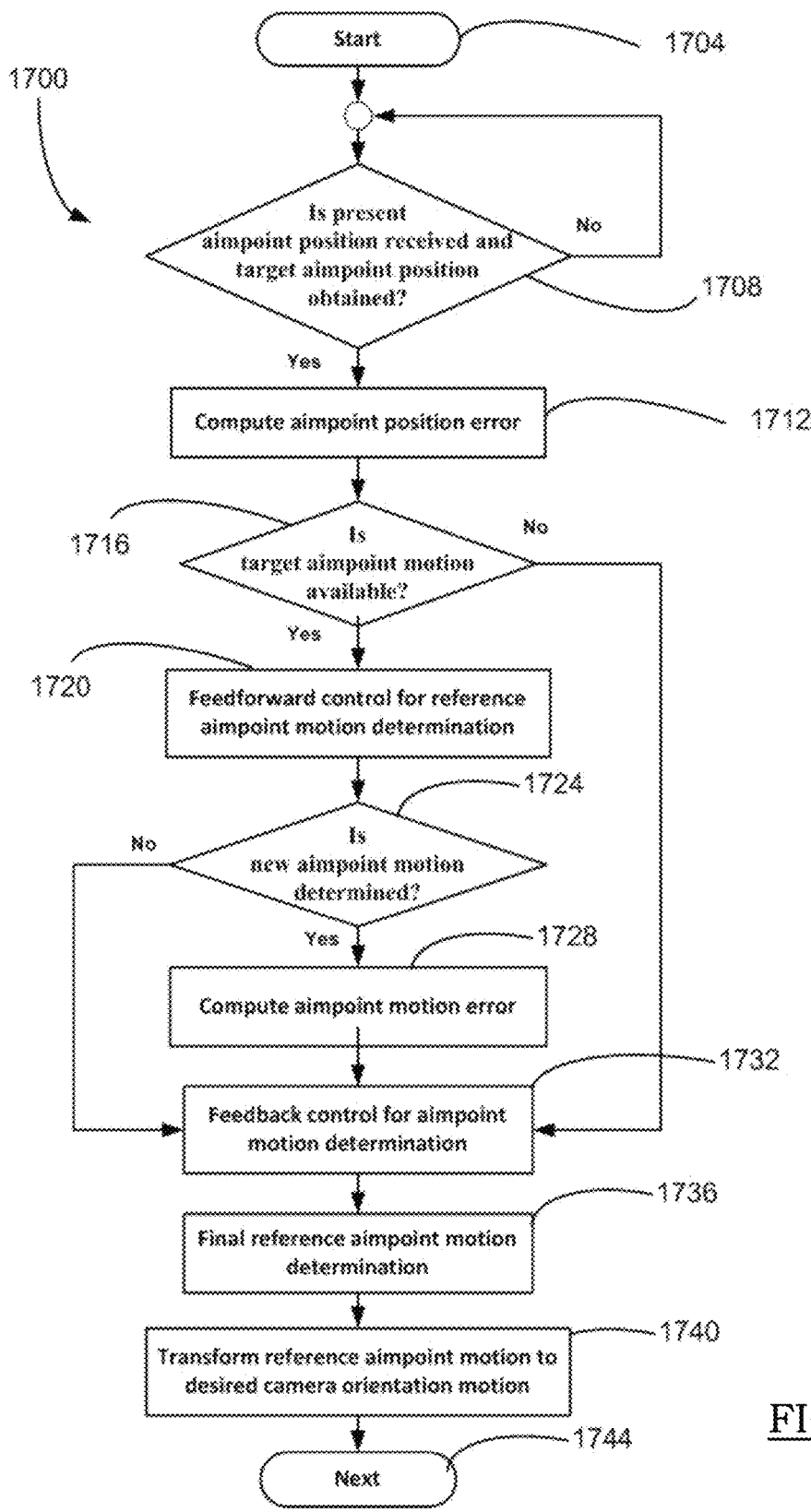
FIG. 16 is a flowchart illustrating a method for reference aim-point's motion determination and subsequent desired camera orientation motion determination according to one or more embodiments.

With reference to FIG. 16, a method for reference aim-point motion determination is illustrated in accordance with one or more embodiments and is generally referenced by numeral 1700. In the exemplary presentation of the reference aim-point motion determination method, a physical pan-tilt camera system is used and the target aim-point is assumed to stay in the object surface 42 all the time. The aim-point's motion in the Z-axis can thus be ignored to simplify the presentation. The proposed method can be easily modified to determine reference and desired aim-point motion for digital pan-tilt camera and camera track system. In this exemplary embodiment, the objective of the automatic target following camera view control is to adjust the camera pan and tilt angles such that the camera aim-point ($x_{sc}$, $y_{sc}$) on the object surface is optimally close to the target aim-point ($x_{tap}$, $y_{tap}$), and the motion of the shooting point ($u_{sc}$, $v_{sc}$) on the object surface is at the same velocity ($u_{tap}$, $v_{tap}$) of the target aim-point. By achieving this, the target object is guaranteed to be displayed in the camera image frames with the best relative frame position in exhibitions.

After starting at step 1704, the process first check on if present aim-point position is received and the target aim-point position is obtained at step 1708. Until received both updated information, the process next goes to step 1712 to compute the position error between the present aim-point and the target aim-point as:

$$e_{xap} = x_{tap} - x_{sc}, e_{yap} = y_{tap} - y_{sc}, e_{zap} = z_{tap} - z_{sc} \quad (30)$$

The process then checks if target aim-point motion is available at step 1716. Given the target aim-point velocity has been determined by equation (29), the feedforward control portion for the reference aim-point motion is determined as:

$$[u_{rap}^{ff}, v_{rap}^{ff}, w_{rap}^{ff}] = \kappa [u_{tap}, v_{tap}, w_{tap}] \quad (31)$$

The feedforward reference aim-point motion aims at aligning the present aim-point's motion in the LCS 34 following the same or similar motion of the target aim-point. $\kappa$ is a scaling factor and $\kappa=1$ is used by default. For the presented embodiment, $e_{zap}=0$ and $w_{rap}^{ff}=w_{tap}=0$.

Next, the process checks on if new aim-point motion measurement is received at step 1724. For a physical pan-tilt camera system, given the knowledge of the present pan angle $\alpha$ and tilt angle $\beta$, the plane motion on a surface has the following relationship between the translational velocity of the camera shooting point ($x_{sc}$, $y_{sc}$) and the angular speeds of camera pan and tilt motion ($107_\alpha$, $107_\beta$):

$$\begin{bmatrix} u_{sc} \\ v_{sc} \end{bmatrix} = \Psi_v \begin{bmatrix} \omega_\alpha \\ \omega_\beta \end{bmatrix} = \begin{bmatrix} \dfrac{-h\sin\alpha\tan\beta}{\tan^2\beta} & \dfrac{-h\cos\alpha}{\sin^2\beta} \\ \dfrac{h\cos\alpha\tan\beta}{\tan^2\beta} & \dfrac{-h\sin\alpha}{\sin^2\beta} \end{bmatrix} \begin{bmatrix} \omega_\alpha \\ \omega_\beta \end{bmatrix} \quad (32)$$

where $\psi_v(\alpha,\beta,h)$ is a camera orientation and position dependent time varying velocity transformation matrix. h is the height of the camera above the object surface. Based on this information, the aim-point motion error can be obtained at step 1728 as exemplary velocity error between the target aim-point and the present aim-point velocity as:

$$\epsilon_{xap} = u_{tap} - u_{sc}, \epsilon_{yap} = v_{tap} - v_{sc} \quad (33)$$

The feedback control portion for the reference aim-point motion determination can now be designed at step 1732. Different control methods can be used for regulating the position error $e_i$ and the velocity error $\epsilon_i$, i=xap, yap, to zero. In this exemplary embodiment of the reference aim-point determination method, a PID type of controller is presented as:

$$\begin{bmatrix} u_{rap}^{fb} \\ v_{rap}^{fb} \end{bmatrix} = \begin{bmatrix} k_{up}e_{xap} + K_{ui}\int_0^t e_{xap}\,dt + k_{ud}\,\epsilon_{xap} \\ k_{vp}e_{yap} + K_{vi}\int_0^t e_{yap}\,dt + k_{vd}\,\epsilon_{yap} \end{bmatrix} \quad (34)$$

$u_{rap}^{fb}$ and $v_{rap}^{fb}$ are the control command in the local positioning coordinate to compensate the position error between the camera aim-point and the target aim-point. $k_{ij}$, for i=u, v and j=p, i, d are control gains.

In the cases when the target aim-point motion is not available at step 1716 or the new aim-point motion is not determined at step 1724, the feedback control for reference aim-point determination at step 1732 is still executed but with $\epsilon_i=0$, for i=xap, yap.

At step 1736, the final reference aim-point motion is determined by combining the feedforward and the feedback control portions as:

$$\begin{bmatrix} u_{rap} \\ v_{rap} \end{bmatrix} = \begin{bmatrix} u_{rap}^{ff} \\ v_{rap}^{ff} \end{bmatrix} + \begin{bmatrix} u_{rap}^{fb} \\ v_{rap}^{fb} \end{bmatrix} \quad (35)$$

The process 1700 next transform the determine reference aim-point motion in LCS 34 to corresponding camera orientation motion in the camera system coordinate system at step 1740. For the exemplary physical pan-tilt camera system, this is achieved by using equation (2):

$$\begin{bmatrix} \omega_\alpha^d \\ \omega_\beta^d \end{bmatrix} = \Psi_v^{-1} \begin{bmatrix} u_{rap} \\ v_{rap} \end{bmatrix}$$

$$= \frac{1}{h} \begin{bmatrix} -\sin(\alpha)\tan(\beta) & \cos(\alpha)\tan(\beta) \\ -\cos(\alpha)\tan(\beta)^2 & -\sin(\alpha)\tan(\beta)^2 \end{bmatrix} \begin{bmatrix} u_{rap} \\ v_{rap} \end{bmatrix} \quad (36)$$

Where $\omega_\alpha^d$ is the desired pan motion speed of the camera system and $\omega_\beta^d$ is the desired tilt motion speed of the camera system. Such desired camera orientation motions are commanded to the camera system to realize the target aim-point tracking control process. The process stops at step 1744 and it continuous with a new iteration of the process 1700.

Based on the exemplary embodiments of subsystem technologies, the overall camera viewing service system's operation and service functions can be summarized and presented as follows. When the service application is activated from a client terminal, it will connect to the LSM 82 or GSM 90 systems to load system information and user account data. When accessing from a wireless terminal device on site, the user's position will be determined by the WiFi based positioning engine 66. Then, an activity site/field map will be displayed to the user with the user's position highlighted on the map. A user can specify his/her intended activity area on this map.

An activity site layout map can be displayed to the user. On this map, system configurations will be shown to tell camera channel position, view angle and area coverage, camera channel parameters and the geometric relationship between the camera channel with the user's present and target locations. Based these information, a user can select candidate camera channels to satisfy his/her object following and activity viewing tasks. On a screen, all the camera channels will be listed in sequence based on a default or user specified queuing criteria. Camera channel ID can be used by default. One exemplary criterion can be a best view ranking evaluated based on camera channel specification, relative distance, facing and view angle to the user's present position or target activity area. The usage status and schedule of the camera channels are also presented.

After assigned ownership over a camera channel by LSM 82 system, a confirmation message will be sent to the user's client application to indicate the camera channel is ready to be used. Meanwhile, based on the user's position, LSM 82 will initiate the camera channel view oriented at the user's present location or his/her intended activity area with a proper coverage of candidate object/objects. Optionally, the camera view can be initiated with direct focus on the user once its location is determined. At the meantime, the camera view is transmitted to the user's terminal application device. The transmitted camera channel view also contains identified candidate objects with highlighted object contours/profiles. Among them, the user can specify the target object/objects. Subsequently, the camera channel view will be adjusted to have a best exhibition of the target object at the center of the view or at any other expected relative position on the user screen. A user can also specify WiFi attachment devices used to identify the target object. In remote application, where no WiFi device is used to locate the target object, a user can manually control the orientation and zooming of the camera channel to identify target object/objects in the camera channel view.

Using HP-PTZ camera channels as an example, the camera channel view will be initiated with a zooming level that covers a sufficiently large area of the activity field. As the user's mouse cursor or finger pointing to the target object, even though no clear object has been profiled, the camera channel will adjust its pan-tilt angle towards centering the object in its view and zoom-in quickly to have sufficient exposure of the objects in the camera views. Meanwhile, object identification will be carried out to continuously identify and profile candidate objects appeared in the channel view together with their vision based position data. Object outlines, center and sizes will be estimated and displayed visually. Such a procedure, from the object identification/profiling to the target object indicating and to the camera view orientation and zooming and next to a deeper level of object identification/profile, will be repeated continuously. As more and more detailed view and object profiles are discovered, a user can keep pointing to a target object until it is uniquely identified and conformed. After the initialization process, a target object's vision identification features are extracted and its position in the activity site is also determined. Furthermore, the target object can either be a single unit or contain multiple bodies. In the latter case, a user selects multiple identified objects on the view screen to define the target object. The target object profiling and parameter estimation method will be changed accordingly. After that, the position and motion of the target object will be continuously estimated. The camera channel view will automatically follow the target object to keep its presence in the cannel view with sufficient object coverage and best exhibition quality.

The propose camera viewing system can be used in many ways and in many circumstance to support sport and activity training purposes and to provide entertainment service purposes. Different uses cases are presented in the following section as exemplary application to demonstrate the innovation and the contribution of the proposed camera viewing system in service the public.

[Use Case 1]: In a sport arena, for instance an ice rink, a user connects to the camera viewing service through WiFi network. The user loads the service application on his/her smartphone and then checked out an available camera channel. Based on the WiFi signal, the position of the user is quickly identified by the WiFi positioning subsystem. Immediately after that, the camera channel orients to focus its view center at the recognized user position. Meanwhile, the camera channel view is displaying on the user's smartphone screen. Now the user is in the camera view. Objects identified from the view will be highlighted with colored object outline envelops and object center points. Among all the identified objects, the user points on himself/herself to define the target object. After that, the camera channel will start control the camera channel view to achieve the best exhibition of the user by adjusting the camera view switch, pan and tilt angle, pan and tilt speed, zooming ratio, frame rate and resolution. The use can record the camera channel view. Now, the user can start his/her performances and activities. The camera view will automatically follow the user and record the use's behavior in the camera view throughout the process. Once done, the user can stop recording and review the recorded movie file on the smartphone device.

[Use Case 2]: A remote terminal user connects to the service from an internet computer. The user loads application program for the camera viewing service and choose the place where an activity event is going on. The user can check out an available camera channel to watch the activity event. The camera channel view will be transmitted to the user's internet PC terminal. While the user manually adjusts the camera orientation to different area of the activity field, objects will be recognized from the camera view frames with highlighted outlines. The user can define the target object once it is shown and recognized in the present camera view. After that, the camera channel will automatically control its orientation to following the motion of the target object. The use can start and stop recording the camera channel view while watching the activity event.

[Use Case 3]: In a sport arena installed with the invented public accessible camera viewing system, a camera channel is used to capture view and to transmit the view to the big screen above the arena. When a service user can check out the camera channel using his/her smartphone device, the user's location in the local positioning system is estimated. The camera's pan and tilt angles will be changed to focus at the user's location with proper zooming ratio. Then the camera view with the user in it will be shown on the big screen. The user can also control the camera's orientation and zooming to scan the field and to focus on a desired area with his/her interested view shown on the big screen. After certain time duration expires, the big screen will switch its connection to another camera channel that is ready to transfer view focusing on another user. Before the camera view is ready to be shown on the big screen, present camera channel user will have the camera view showing on his/her smartphone screen or sharing with a group of registered users.

[Use Case 4]: When the estimated target is moving at an excessively fast speed, the camera view will not be able to keep following the motion of the target speed due to the orientation and zooming constraints. In this case, it is determined that the target object will be disappeared from the view shortly. A warning message or sound will be generated to alert the service user of the situation with suggested subsequent actions to manually operate the camera channel in order to regain the view coverage over the target object.

[Use Case 5]: A user having the camera viewing system installed at home can defined kids playing near the neighborhood as the target objects. The camera channel will automatically follow the kids and present their activities in the camera view. The camera view can be displayed on the screen of the user's computer or TV devices. Sub-screen can also be used to display the camera view in a small area on the computer or TV screen without interrupt the user's normal work or entertainment. When the kids are or are about to move into a certain region or out of the range of the camera view, alerting signal will be generated to warn the user of the abnormal event.

[Use Case 6]: In metropolitan area, the motion of a vehicle or a person can be modeled and predicted based on the activity recorded from the camera views. Based on the predicted future position of the vehicle or person, the camera view can be switched among cameras in the metropolitan area to keep the target object tracked in camera views.

As demonstrated by the embodiments described above, the methods and apparatus of the present invention provide advantages over the prior art by integrating a local coordinate system and a positioning system to the camera viewing control system to provide connected and automatic object tracking camera viewing services.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A method for controlling an aim-point motion of a camera system to track a target object in motion comprising:

determining a first position and a first motion of an aim-point of the camera system in a local coordinate system from a second position and a second motion of a camera orientation in a camera system coordinate system;

determining a third position and a third motion of a target aim-point in said local coordinate system dynamically based on an estimated motion of said target object and an estimated future position of said target object;

determining a reference aim-point motion in said local coordinate system by calculating $$\begin{bmatrix} u_{rap} \\ v_{rap} \end{bmatrix} = \begin{bmatrix} u_{rap}^{ff} \\ u_{rap}^{ff} \end{bmatrix} + \begin{bmatrix} u_{rap}^{fb} \\ u_{rap}^{fb} \end{bmatrix}, \text{ where } \begin{bmatrix} u_{rap}^{ff} \\ u_{rap}^{ff} \end{bmatrix}$$

is a feedforward control portion determined by $$\begin{bmatrix} u_{rap}^{ff} \\ u_{rap}^{ff} \end{bmatrix} = K \begin{bmatrix} u_{tap} \\ v_{tap} \end{bmatrix},$$

where K is a scaling factor and $$\begin{bmatrix} u_{tap} \\ v_{tap} \end{bmatrix}$$

is the third motion of the target aim-point, and where $$\begin{bmatrix} u_{rap}^{fb} \\ u_{rap}^{fb} \end{bmatrix}$$

is a feedback control portion determined by a combination of feedback control elements including $$\begin{bmatrix} k_{up} e_{xap} \\ k_{vp} e_{yap} \end{bmatrix}, \begin{bmatrix} k_{ui} \int_0^\tau e_{xap} dt \\ k_{vi} \int_0^\tau e_{yap} dt \end{bmatrix}, \text{ and } \begin{bmatrix} k_{ud} \in_{xap} \\ k_{wd} \in_{yap} \end{bmatrix},$$

where $k_{ij}$, for i=u, v and j=p, i, d are control gains, $e_i$ and $\epsilon_i$ for i=xap, yap are position error and velocity error, respectively;

wherein said reference aim-point motion substantially compensates a first error between said first position and said third position towards zero, and said reference aim-point motion substantially compensates a second error between said first motion and said third motion towards zero;

transforming said reference aim-point motion to a desired camera orientation motion in said camera system coordinate system; and controlling the motion of said camera system at said desired camera orientation motion.

2. The method of claim 1, wherein said second position of said camera orientation comprises pan and tilt angles of said camera system, and wherein said second motion of said camera orientation comprises panning and tilting angular motions of said camera system; wherein said controlling the motion of said camera system at said desired camera orientation motion comprises at least one of:
controlling said panning and tilting angular motions at desired angular speeds transformed from said reference aim-point motion;
controlling said panning and tilting angular motions at desired angular accelerations transformed from said reference aim-point motion.

3. The method of claim 1, wherein said second position of said camera orientation comprises digital pan and digital tilt position of said camera system, and wherein said second motion of said camera orientation comprises digital panning and digital tilting motions of said camera system; wherein said controlling the motion of said camera system at said desired camera orientation motion comprises at least one of:
controlling said digital panning and digital tilting motions at desired digital panning and tilting speeds in a camera view coordinate systems;
controlling said digital panning and digital tilting motions at desired digital panning and tilting accelerations in a camera view coordinate system.

4. The method of claim 1, wherein said desired camera orientation motion in said camera system coordinate system further comprises translational camera movements along a camera track system; and wherein said controlling the motion of said camera system further comprises at least one of:
controlling the motion of said camera system along said camera track system at desired translational camera movement speeds transformed from said reference aim-point motion;
controlling the motion of said camera system along said camera track system at desired translational camera movement accelerations transformed from said reference aim-point motion.

5. The method of claim 1. wherein said third position and said third motion of said target aim-point are dynamically determined in said local coordinate system comprising:
obtaining at least one position measurement of a target object in said local coordinate system from a local positioning system;
estimating a motion of said target object in said local positioning system based on said at least one position measurement of said target object;
estimating a future position of said target object in said local positioning system; and
determining said third position and said third motion of said target aim-point based on said motion of said target object and said future position of said target object.

6. The method of claim 5, wherein said local positioning system comprises a vision based local positioning system, wherein said at least one position measurement of a target object is obtained using both an absolute vision based positioning method and a relative vision based positioning method.

7. The method of claim 5, wherein said local positioning system comprises an assisted vision positioning system, wherein said at least one position measurement of a target object is relatively determined in a video frame coordinate system based on field characteristic points that have known position coordinates both in said local coordinate system and in said video frame coordinate system; and wherein said field characteristic points comprise at least on of:
existing field marking point that is captured in camera video frame;
generated field characteristic point using laser beam.

8. The method of claim 5, wherein said local positioning system comprises an enhanced WiFi positioning system, wherein said at least one position measurement of a target object is obtained using both received signal strength (RSS) measurement and inertial sensor measurement received from WiFi devices.

9. The method of claim 5, wherein said estimating the motion of said target object and estimating the future position of said target object are achieved using a Bayes filter algorithm based processing method comprising:
a WiFi and Vision position fusion method that achieve position data for said target object by applying at least one of:
Central Limit Theorem;
Kalman filter;
Particle filter;
Hidden Markov Model;
a motion estimation method that obtains motion velocities and future positon for said target object by applying at least one of:
Kalman Filter;
Particle filter;
a multi-sensor function method that fuse multi-channel raw data and processed data to obtain position and motion states for said target object using multi-sensor Kalman Filtering algorithm based on a Wiener process acceleration model.

10. The method of claim 9, wherein said Bayes filter algorithm based processing method adjusts its internal weighting on input channels based on the data availability and data quality of said input channels.

11. The method of claim 5, wherein said estimating the motion of said target object and estimating the future position of said target object further comprises an attitude calculation method that uses inertial measurement unit (IMU) data to determine the facing direction of said target object.

12. An apparatus for controlling an aim-point motion of a camera system to track a target object in motion comprising:
at least one camera that comprises a camera orientation control system to control said aim-point motion and a camera state sensing system to measure a first position and a first motion of camera orientation;
a local positioning system that provides a second position measurement and a second motion measurement of said target object in a field;
a local coordinate system that specifies coordinates for said second position measurement and a second motion measurement of said target object in said field uniformly for all positioning subsystems used in said local positioning system;
a service control system that controls said aim-point motion of said camera system in substantially the same motion of said target object in said local coordinate system by determining a reference aim-point motion in said local coordinate system by calculating $$\begin{bmatrix} u_{rap} \\ v_{rap} \end{bmatrix} = \begin{bmatrix} u_{rap}^{ff} \\ u_{rap}^{ff} \end{bmatrix} + \begin{bmatrix} u_{rap}^{fb} \\ u_{rap}^{fb} \end{bmatrix}, \text{ where } \begin{bmatrix} u_{rap}^{ff} \\ u_{rap}^{ff} \end{bmatrix}$$

is a feedforward control portion determined by $$\begin{bmatrix} u_{rap}^{ff} \\ u_{rap}^{ff} \end{bmatrix} = K \begin{bmatrix} u_{tap} \\ v_{tap} \end{bmatrix},$$

where K is a scaling factor and $$\begin{bmatrix} u_{tap} \\ v_{tap} \end{bmatrix}$$

is the third motion of the target aim-point, and where $$\begin{bmatrix} u_{rap}^{fb} \\ u_{rap}^{fb} \end{bmatrix}$$

is a feedback control portion determined by a combination of feedback control elements including $$\begin{bmatrix} k_{up}e_{xap} \\ k_{vp}e_{yap} \end{bmatrix}, \begin{bmatrix} k_{ui}\int_0^t e_{xap}\,dt \\ k_{vi}\int_0^t e_{yap}\,dt \end{bmatrix}, \text{ and } \begin{bmatrix} k_{ud}\in_{xap} \\ k_{wd}\in_{yap} \end{bmatrix},$$

where $k_{ij}$, for i=u, v and j=p, i, d are control gains, $e_i$ and $\epsilon_i$ for i=xap, yap are position error and velocity error, respectively;

wherein said reference aim-point motion substantially compensates a first error between said first position and said second position measurement towards zero, and said reference aim-point motion substantially compensates a second error between said second motion measurement and said first motion towards zero;

transforming said reference aim-point motion to a desired camera orientation motion in said camera system coordinate system; and controlling the motion of said camera system at said desired camera orientation motion; and a communications network for connecting said at least one camera to said service control system and for connecting said local positioning system to said service control system; wherein said communications network comprises a WiFi communication system.

13. The apparatus of claim 12. wherein said local positioning system obtains coordinates for said second position measurement of said target object in said local coordinate system comprising at least one of:

a vision based positioning system using both an absolute vision based positioning method and a relative vision based positioning method;

an assisted vision positioning system that determines said second position measurement of said target object relatively with respect to filed characteristic points;

an enhanced WiFi positioning system that determines said second position measurement of said target object using both received signal strength (RSS) measurement and inertial sensor measurement received from said WiFi communication system in said communications network.

14. The apparatus of claim 12, wherein said service control system comprising:
memory;
at least one processor operably coupled to said memory and said communications network; said at least one processor is configured to execute a program of instructions, wherein said program of instructions comprising:
at least one instruction to obtain orientation and motion of said at least one camera;
at least one instruction to obtain said second position measurement of said target object in said local coordinate system;
at least one instruction to control said aim-point motion of said camera system;
at least one computer program product that, when executed, causes actions of said service control system comprising:
determining a first position and a first motion of said aim-point in said local coordinate system from a second position and a second motion of camera orientation in a camera system coordinate system for said at least one camera;
determining a third position and a third motion of a target aim-point in said local coordinate system dynamically based on an estimated motion of said target object and an estimated future position of said target object;
determining a reference aim-point motion in said local coordinate system using a control algorithm comprising a feedback control algorithm, wherein said reference aim-point motion substantially compensate a first error between said first position and said third position towards zero, and said reference aim-point motion substantially compensate a second error between said first motion and said third motion towards zero;
transform said reference aim-point motion to a desired camera orientation motion for each of said at least one camera; and
control the motion of each of said at least one camera at said desired camera orientation motion.

15. The apparatus of claim 14, wherein said service control system further comprises an object tracking engine operably coupled to said memory and said at least one processor, wherein said object tracking engine executing a Bayes filter algorithm to execute at least one of: a multi-sensor fusion function that fuse multi-channel raw data and processed data to obtain position for said second position measurement by applying at least one of:
Central Limit Theorem;
Kalman filter;
Particle filter;
Hidden Markov Model;
estimate a position of said target object based on said second position measurement of said target object;
estimate a motion of said target object based on said second position measurement of said target object;
predict a future position of said target object.

16. The apparatus of claim 14, wherein said control algorithm further comprises a feedforward control algorithm that uses said third motion of said target aim-point to generate said reference aim-point motion.

17. The apparatus of claim 14, wherein said second position of said camera orientation comprises pan and tilt angles of said camera system, and wherein said second motion of said camera orientation comprises panning and tilting angular motions of said camera system; wherein said control the motion of each of said at least one camera at said desired camera orientation motion comprises at least one of:

controlling said panning and tilting angular motions at desired angular speeds transformed from said reference aim-point motion;

controlling said panning and tilting angular motions at desired angular accelerations transformed from said reference aim-point motion.

18. The apparatus of claim 14, wherein said second position of said camera orientation comprises digital pan and digital tilt position of said camera system, and wherein said second motion of said camera orientation comprises digital panning and digital tilting motions of said camera system; wherein said control the motion of each of said at least one camera at said desired camera orientation motion comprises at least one of:

controlling said digital panning and digital tilting motions at desired digital panning and tilting speeds in a camera view coordinate system;

controlling said digital panning and digital tilting motions at desired digital panning and accelerations in a camera view coordinate system.

19. The apparatus of claim 12, wherein said camera system further comprises a track based camera position platform, a track position sensing system and a computerized system for camera track motion control; and said computerized system comprises at least one computer program product that, when executed, causes actions of said camera system comprising:

controlling a motion of said camera system along said track based camera position platform at desired translational movement speeds determined by said service control system to substantially compensate said first error and said second error towards zeros;

controlling the motion of said camera system along said track based camera position platform at desired translational movement accelerations determined by said service control system to substantially compensate said first error and said second error towards zeros.

* * * * *